United States Patent
Hyde et al.

(10) Patent No.: US 9,140,499 B2
(45) Date of Patent: *Sep. 22, 2015

(54) PHASE-CHANGE COOLING OF SUBTERRANEAN POWER LINES

(75) Inventors: Roderick A. Hyde, Redmond, WA (US); Jordin T. Kare, Seattle, WA (US); Nathan P. Myhrvold, Bellevue, WA (US); David B. Tuckerman, Lafayette, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 405 days.

This patent is subject to a terminal disclaimer.

(21) Appl. No.: 13/605,836

(22) Filed: Sep. 6, 2012

(65) Prior Publication Data
US 2014/0020861 A1   Jan. 23, 2014

Related U.S. Application Data

(63) Continuation of application No. 13/552,532, filed on Jul. 18, 2012, now Pat. No. 8,872,022.

(51) Int. Cl.
*H02G 3/03*    (2006.01)
*H05K 7/20*    (2006.01)
(Continued)

(52) U.S. Cl.
CPC .............. *F28D 15/02* (2013.01); *H02G 9/02* (2013.01); *F28D 2021/0028* (2013.01); *Y02E 10/10* (2013.01)

(58) Field of Classification Search
CPC ............ H02G 3/03; H02G 9/02; H02G 9/00; H02G 9/06; H05K 7/20; F28D 15/02; F28D 15/00; F28D 2021/0028; Y02E 10/10; Y02E 10/12

USPC ....... 174/17 R, 17 VA, 68.1, 68.3, 70 CC, 96, 174/15.5, 15.6, 16.1, 15.1, 15.2; 361/677, 361/600, 601, 678, 679.01, 688, 689, 699, 361/701, 676; 165/104.11, 104.22, 104.23, 165/104.28, 104.33, 104.25, 104.31, 165/104.19; 405/154.1, 158, 159
See application file for complete search history.

(56) References Cited

U.S. PATENT DOCUMENTS 1,754,314 A   4/1930   Gay
3,363,046 A   1/1968   Endacott
(Continued)

FOREIGN PATENT DOCUMENTS

GB   1224741 A   3/1971

OTHER PUBLICATIONS

PCT International Search Report; International App. No. PCT/US2013/050908; Dec. 13, 2013; pp. 1-2.
(Continued)

*Primary Examiner* — Angel R Estrada

(57) ABSTRACT

A cooling system for a subterranean power line may include a cooling tube configured to house a fluid. Heat generated by the subterranean power line may be radiated and/or conducted to the cooling tube and absorbed by the fluid within the cooling tube. As the fluid heats up, it may change phase from a liquid to a gas. The hot gas may rise to a heat-exchanging condenser configured to dissipate the heat and condense the fluid back into a liquid. The cool, condensed liquid my return from the heat-exchanging condenser to the cooling tube. Risers, gas transport tubes, pressure regulation systems, fluid storage tanks, and other components described herein may increase the efficiency of the cooling system and/or otherwise improve the viability of the cooling system for subterranean power lines.

37 Claims, 20 Drawing Sheets

(51) Int. Cl.
 *F28D 15/02* (2006.01)
 *H02G 9/02* (2006.01)
 *F28D 21/00* (2006.01)

(56) References Cited

U.S. PATENT DOCUMENTS

| | | |
|---|---|---|
| 3,463,869 A | 8/1969 | Cooley et al. |
| 3,609,206 A | 9/1971 | McConnell |
| 3,674,912 A | 7/1972 | Titus et al. |
| 3,736,364 A | 5/1973 | Kubo |
| 3,800,062 A | 3/1974 | Kataoka et al. |
| 3,946,142 A | 3/1976 | Kellow et al. |
| 3,949,153 A | 4/1976 | Pirooz et al. |
| 3,955,042 A | 5/1976 | Kellow et al. |
| 3,958,074 A | 5/1976 | Pirooz et al. |
| 3,962,529 A | 6/1976 | Kubo |
| 4,048,807 A | 9/1977 | Ellers et al. |
| 4,091,230 A | 5/1978 | Rabinowitz et al. |
| 4,215,234 A | 7/1980 | Fukuda et al. |
| 4,321,422 A | 3/1982 | Rogers et al. |
| 4,539,432 A | 9/1985 | Koppl et al. |
| 4,921,041 A | 5/1990 | Akachi |
| 6,161,587 A | 12/2000 | Durham |
| 2010/0179064 A1 | 7/2010 | Willen et al. |

OTHER PUBLICATIONS

PCT International Search Report; International App. No. PCT/US2013/050913; Dec. 6, 2013; pp. 1-2.

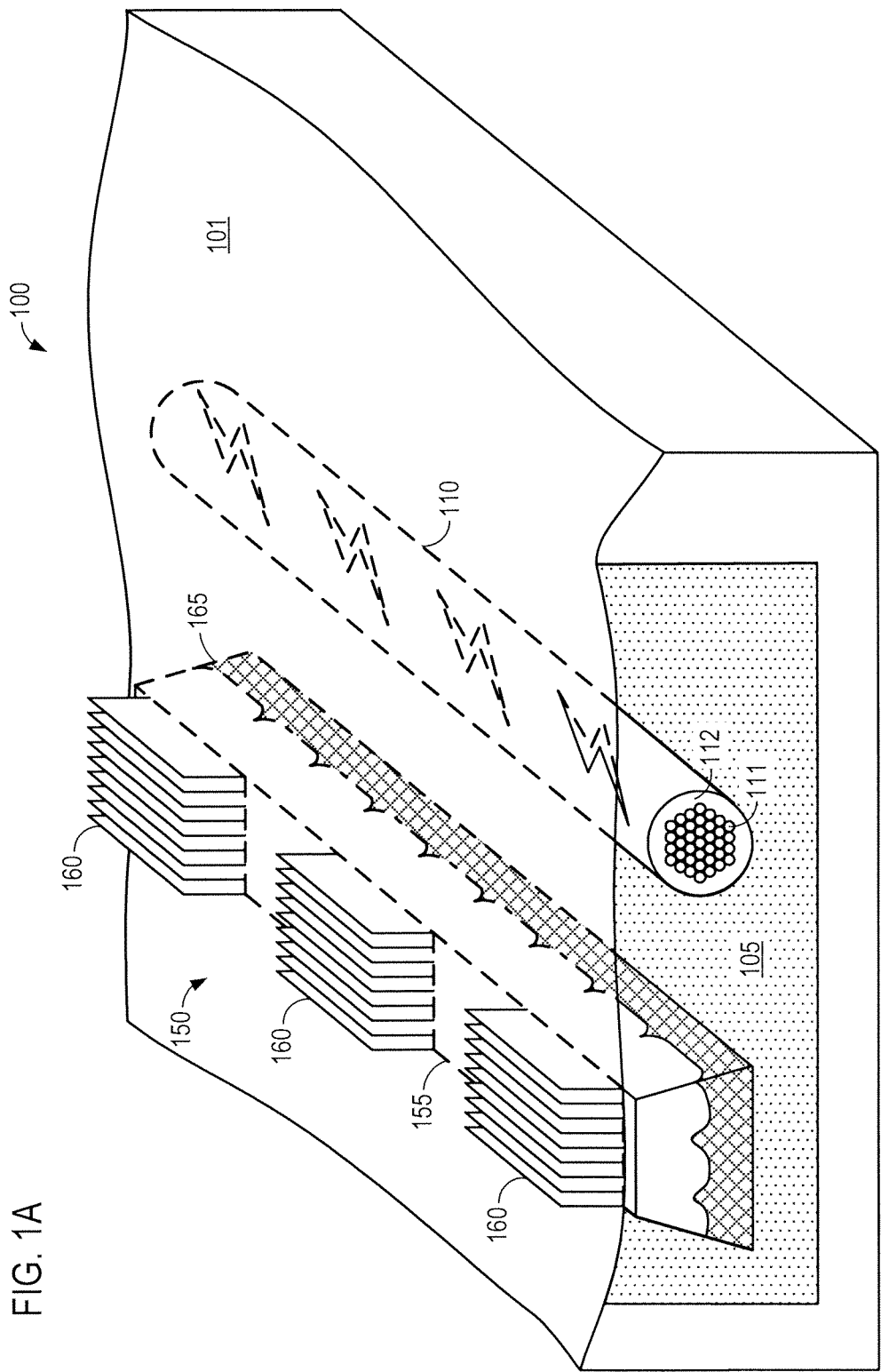

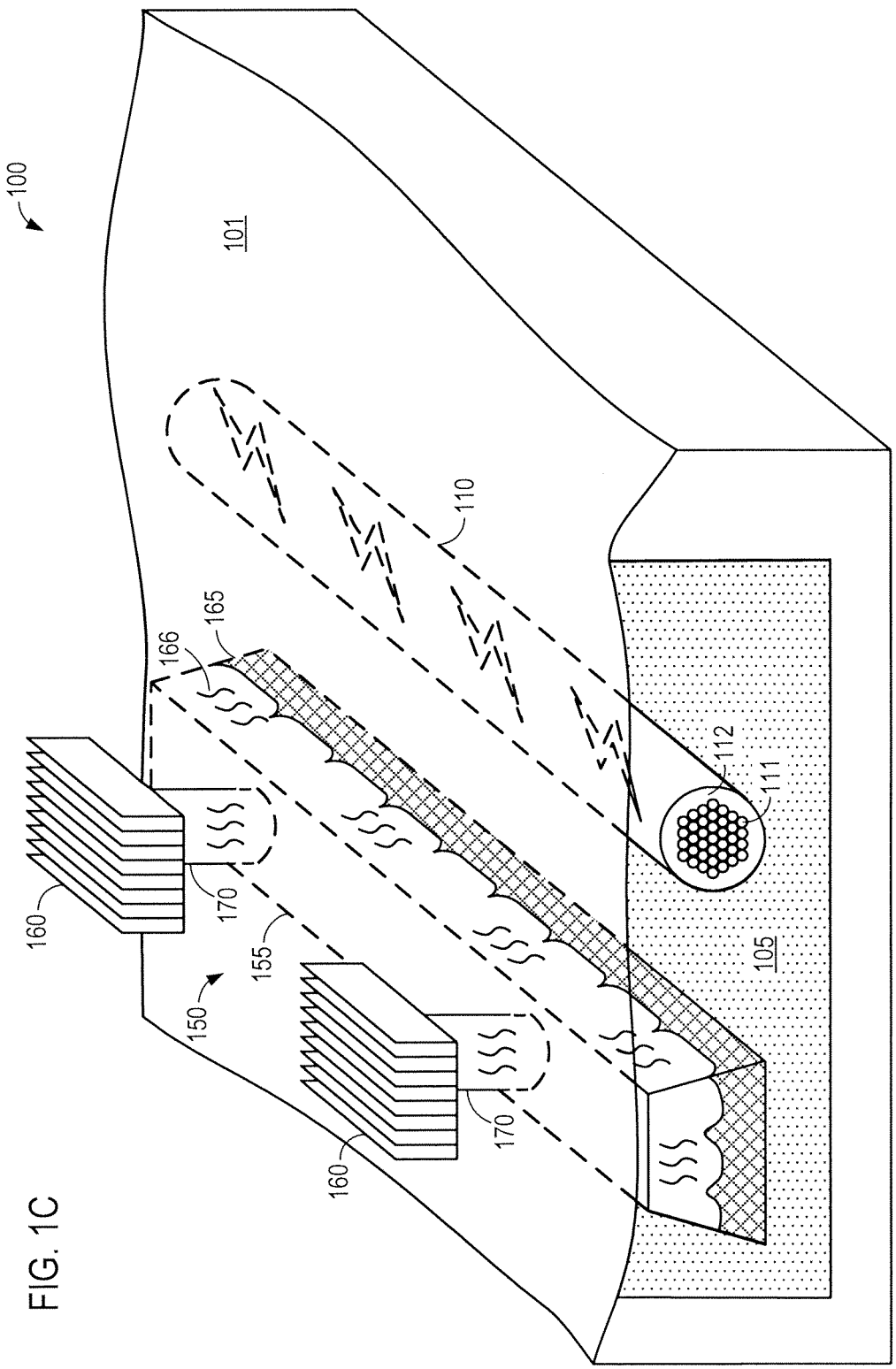

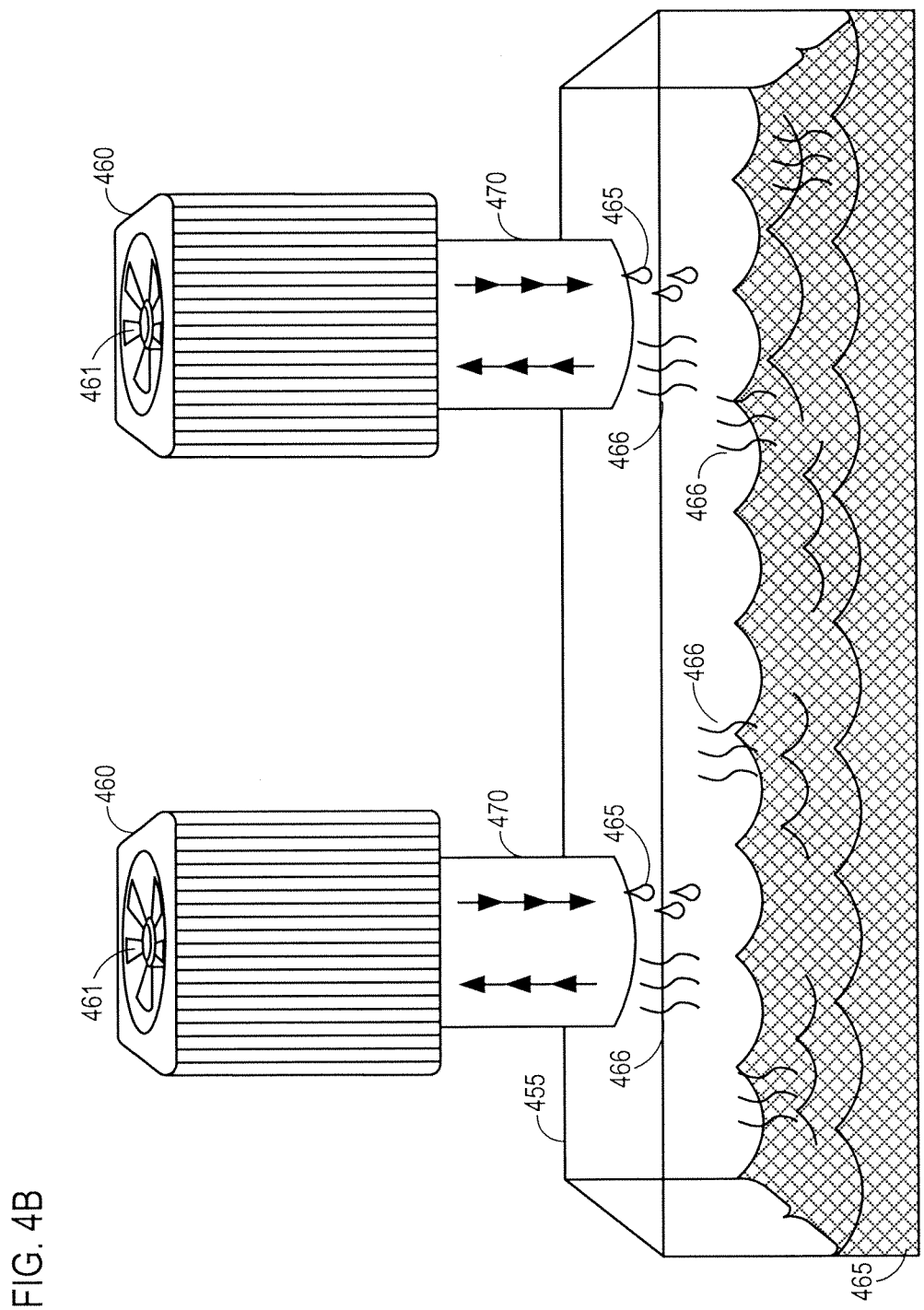

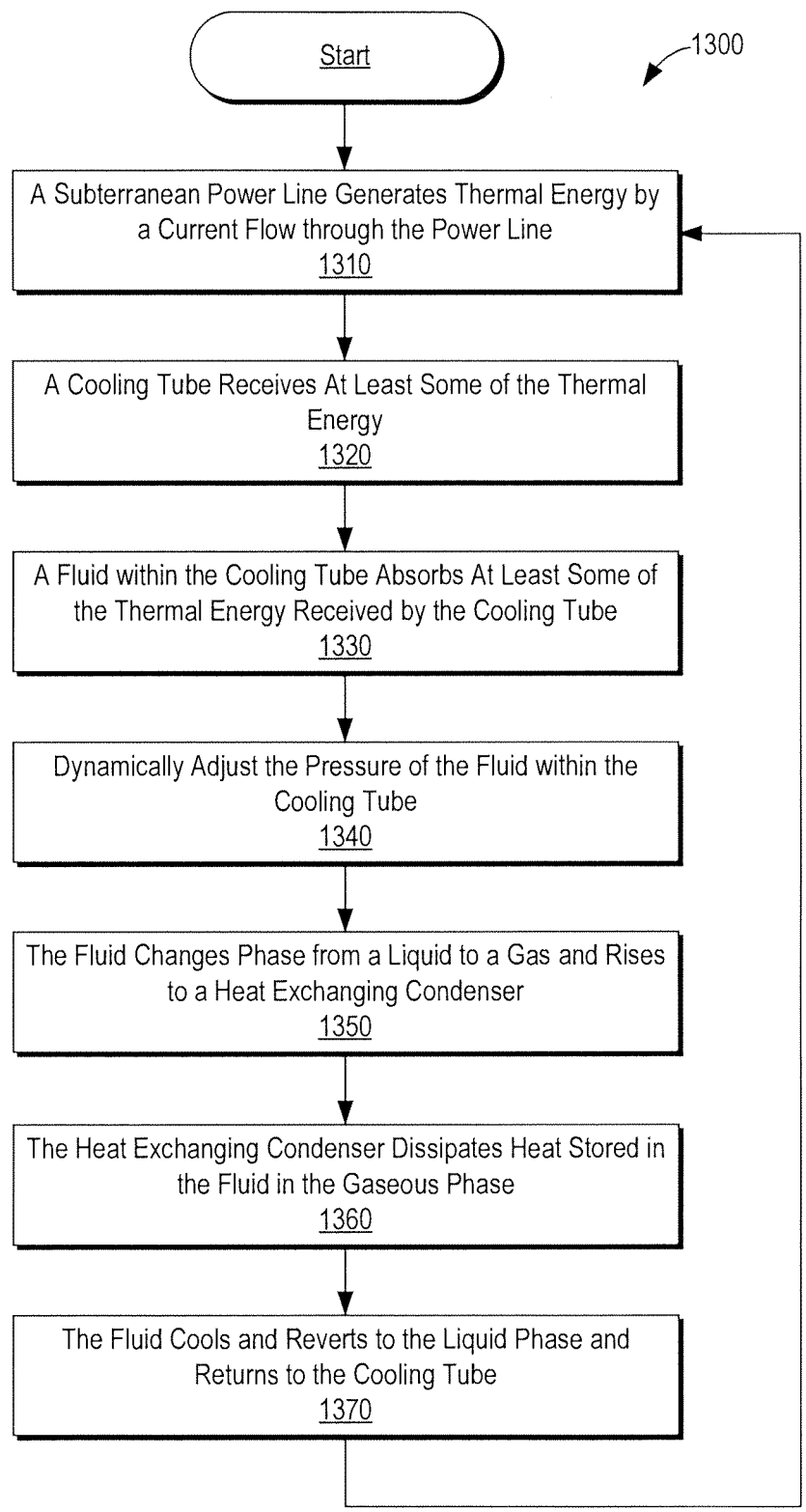

PHASE-CHANGE COOLING OF SUBTERRANEAN POWER LINES

CROSS-REFERENCE TO RELATED APPLICATIONS

This application is a continuation of U.S. patent application Ser. No. 13/552,532, filed Jul. 18, 2012, for "Phase-Change Cooling of Subterranean Power Lines", which is hereby incorporated herein by reference.

TECHNICAL FIELD

This disclosure relates to systems and methods for subterranean power transmission systems using phase-change cooling systems including a cooling tube and a heat-exchanging condenser.

SUMMARY

One limitation of high power transmission systems is Joule heating, also known as ohmic heating and resistive heating. Resistive heating is the process by which the passage of an electric current through a conductor releases heat. The heat produced is proportional to the square of the current multiplied by the electrical resistance of the wire. Accordingly, high current transmission systems may generate a significant amount of heat. Overhead power lines, extending between towers, generate heat that is absorbed by the surrounding air. Wind, and convective currents, in the free flowing air may adequately cool overhead power lines. Accordingly, overhead power lines may not require independent cooling systems.

In contrast, subterranean power lines may generate heat that cannot be adequately dissipated by the surrounding ground. As the temperature of the power line and the surrounding ground increase, the power losses may increase, thereby decreasing the efficiency of the power line. Moreover, if the power line and the surrounding ground get too hot, the power line insulation may fail, other equipment may fail, the temperatures may present an environmental hazard, and/or the temperatures may present a safety hazard. Accordingly, without the use of a dedicated cooling system, the amount of current that may be drawn through a subterranean power transmission system may be limited to less than could be drawn through a similar above-ground or overhead power line. The present disclosure provides various systems and methods for cooling subterranean power lines. The systems and methods described herein may be implemented in new installations and/or configured to retrofit existing subterranean power lines.

In various embodiments, one or more subterranean (used herein synonymously with underground) power lines may be installed along a first path. For example, a subterranean power line may be installed between two buildings, two cities, or between two states. As described above, resistive heating may limit the amount of current that can safely and/or efficiently be drawn through a subterranean power line. By cooling a subterranean power line, more current may be drawn through the subterranean power line and/or the temperature of the subterranean power line and/or surrounding ground may decrease.

As described in greater detail below, a cooling tube may be installed adjacent a subterranean power line. The cooling tube may be installed before, after, or concurrently with the subterranean power line. In various embodiments, the cooling tube may be configured to house a fluid in a liquid phase. Heat (thermal energy) generated by the subterranean power line may be radiated and/or conducted to the cooling tube and absorbed by the fluid within the cooling tube. As the fluid heats up, it may change phase from a liquid to a gas. The hot gas may rise to a heat-exchanging condenser configured to dissipate the heat and condense the fluid. The cool, condensed liquid may return from the heat-exchanging condenser to the cooling tube. The pressure within the cooling tube may be maintained or dynamically adjusted to set or control the vaporization temperature of the fluid.

More than one cooling tube may be used to cool a single power line. Conversely, a single cooling tube may be used to cool multiple power lines. Risers, gas transport tubes, pressure regulation systems, fluid storage tanks, and other components described in greater detail herein may be included in various embodiments of the systems and methods described herein.

BRIEF DESCRIPTION OF THE DRAWINGS

FIG. 1A illustrates an embodiment of an underground power transmission system including a cooling system configured to absorb and dissipate heat generated by a subterranean power line.

FIG. 1C illustrates a cooling system including risers connecting the cooling tube to heat-exchanging condensers positioned aboveground.

FIG. 4B illustrates an embodiment of a liquid fluid absorbing heat, changing to a gaseous phase, rising, and condensing via two active heat-exchanging condensers.

FIG. 13 illustrates a flow chart of a method for cooling a subterranean power line by dynamically adjusting the pressure of a fluid within a phase-change cooling system.

DETAILED DESCRIPTION

Figure 1B:
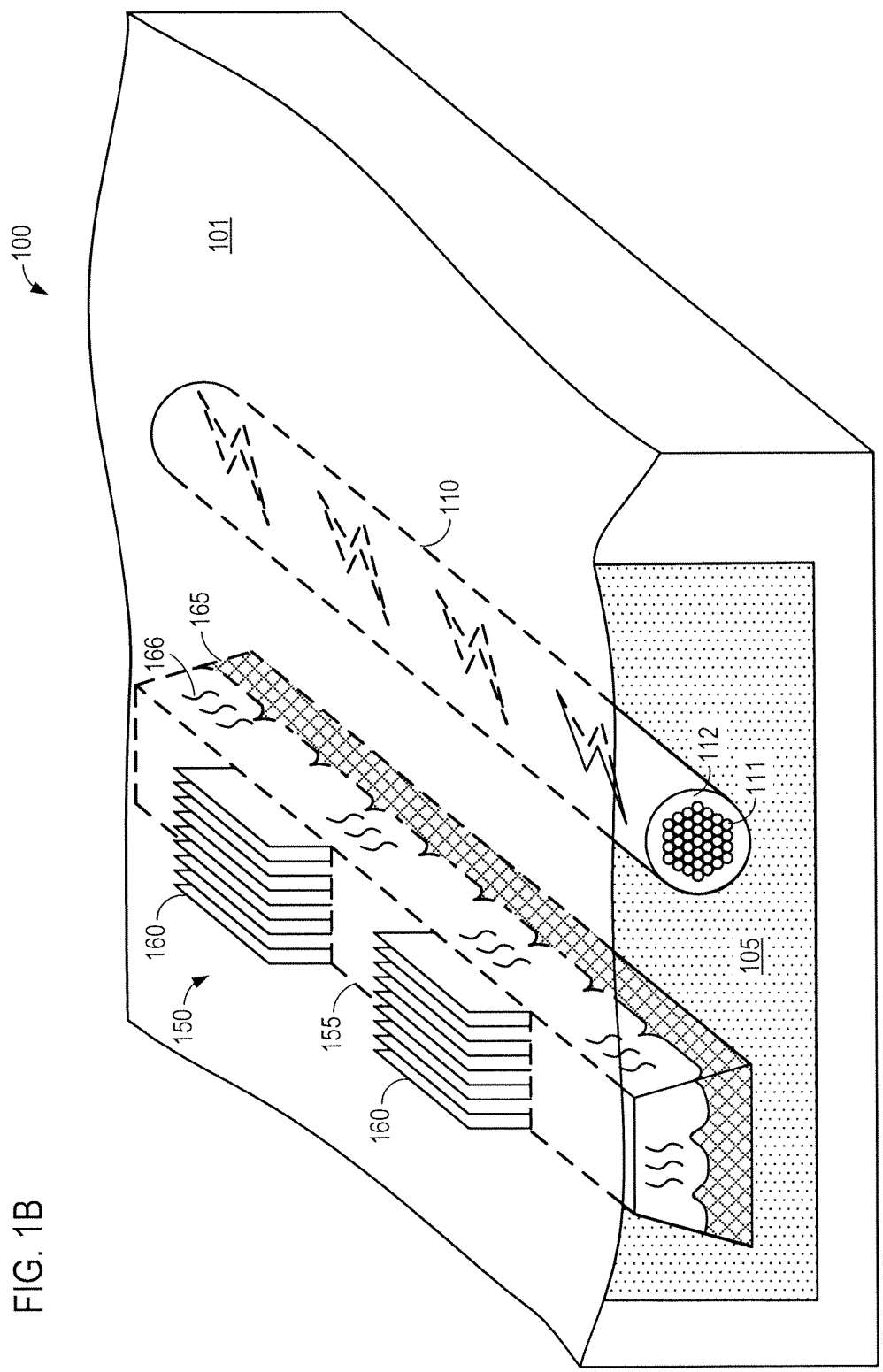
FIG. 1B Illustrates an embodiment of a fluid within a cooling tube changing phase from a liquid to a gas as it absorbs heat generated by the subterranean power line.

One or more subterranean power lines may be installed along a path. For example, a subterranean power line may be installed between two buildings, two cities, or between two states. As described above, resistive heating may limit the amount of current that can safely and/or efficiently be drawn through the subterranean power line. By cooling the subterranean power line, more current may be drawn through the subterranean power line and/or the temperature of the subterranean power line and/or surrounding ground may decrease. The ability to efficiently and cost-effectively cool a subterranean power line may increase the viability of underground power transmission systems as compared to overhead and aboveground power lines.

According to the presently described system and methods, a cooling tube installed adjacent a subterranean power line may be configured to absorb and dissipate heat generated by a current flow in the subterranean power line. In some embodiments, the cooling tube may be distinct from the power line. That is, it may not be an integral part of the power line. Rather, the cooling tube may provide a distinct and separate enclosure for the fluid. In so doing, the fluid may be housed within the cooling tube and not directly contact the power line. The use of a separate cooling tube and power line provides for the possibility of separate installation events (e.g., retrofitting an existing power line with this cooling system). The use of a separate cooling tube and power line allows separate optimization of the costs, material, or characteristics of each, without tradeoffs, compatibility issues, or design compromises as might be required for an integral system.

The cooling tube may be installed before, after, or concurrently with the subterranean power line. The cooling tube may be installed proximate to the subterranean power line, either at the same depth, or above or below it. Heat (thermal energy) generated by the subterranean power line may be radiated and/or conducted to a cooling tube and absorbed by a fluid housed within the cooling tube. As the fluid heats up, the fluid may change phase from a liquid to a gas. The hot gas may rise to a heat-exchanging condenser. The heat-exchanging condenser may dissipate the heat stored in the fluid and condense the fluid back into a liquid. The cooled liquid fluid may return from the heat-exchanging condenser to the cooling tube.

More than one cooling tube may be used to cool a single power line. Conversely, a single cooling tube may be used to cool multiple power lines. Risers, gas transport tubes, pressure regulation systems, fluid storage tanks, and other components described in greater detail herein may be included in various embodiments of the systems and methods described herein.

In some embodiments, the cooling tube may be sealed, such that the fluid is maintained within a closed system. The cooling tube may be only partially filled with the fluid so that the fluid can expand and/or more readily change phase within the cooling tube. In addition to the vaporizable fluid, the cooling tube may also contain an additional gas, for example air or helium, which is non-condensable at the temperature and pressures encountered during operation of the system. In some embodiments, the cooling tube may be pressurized with a positive or negative pressure relative to the pressure outside the cooling tube. The cooling tube may include a pressure regulation system configured to maintain or adjust the pressure based on a set of pressure settings. The cooling tube may also include a storage tank configured to store a reserve of the fluid. The pressure regulation system may be configured to add or remove fluid and/or one or more liquids, gases, or solids in order to adjust or maintain a pressure and/or associated temperature. The pressure regulation system may work in tandem with the storage tank to maintain and/or adjust the pressure and/or amount of fluid within the cooling tube.

In various embodiments, the pressure regulation system may monitor one or more characteristics associated with the cooling system and dynamically adjust the pressure within the cooling tube in order to control the temperature of the subterranean power line. For instance, the pressure regulation system may monitor a temperature associated with the cooling system, a time, a pressure associated with the cooling system, an amount of fluid in a gaseous phase, an amount of fluid in a liquid phase, a load on the subterranean power line, etc. The pressure regulation system may then dynamically adjust the internal pressure of the cooling tube in order to control the vaporization and/or condensation temperature(s) of the fluid. The pressure regulation system may control the pressure within the cooling tube by adding or removing a gas, liquid, or solid to the cooling tube.

The pressure regulation system may be manually controlled or automatically configured to adjust the pressure based on one or more conditions. For example, the pressure regulation system may adjust the pressure based on a temperature of a ground material, an ambient air temperature near a heat-exchanging condenser, a power dissipation within the power line, a thermal resistance between the power line and the cooling tube, an ambient wind speed, a temperature of the power line, a temperature of the fluid, and/or to control a vaporization temperature of the fluid. Additionally or alternatively, the pressure may be adjusted based on a season, a time of day, an average current flow in the power line, and/or an instantaneous current flow in the power line.

The cooling tube may be manufactured using any suitable material. For example, the cooling tube may comprise polyvinyl chloride (PVC), wood, polycarbonate, acrylonitrile butadiene styrene (ABS), polypropylene (PP), polyethylene (PE), polyvinylidene fluoride (PVDF), a metal, and/or other suitable materials. The cooling tube may be configured to reduce or eliminate induced current flows that could be caused by the adjacent power line. For example, the cooling tube may be grounded, insulated, or isolated.

In some embodiments, the cooling tube may be installed in direct contact with a conductor of the power line, or in direct contact to an insulator enclosing the conductor of the power line. In other embodiments, a gap of between 1 millimeter and 2 meters or more may separate the power line and the cooling tube. Electrical insulation, air, heat-conducting materials, and/or backfill material may be placed in the gap separating the cooling tube and the subterranean power line. Backfill materials may include sand, dirt, gravel, an adhesive, concrete, a thermal conductivity enhancer, metal, a metal mesh, and/or a high-K material. The cooling tube and the power line may be joined together via a connecting member configured to enhance thermal conduction and/or via an adhesive.

In some embodiments, the heat-exchanging condenser(s) may be fluidly connected to the cooling tube via one or more risers. The risers may allow for hot fluid in a gaseous phase to rise up to the heat-exchanging condensers. In such embodiments, the heat-exchanging condensers may be positioned above the surface of the ground, even when the cooling tube and/or subterranean power line are relatively deep. In some embodiments, cooled fluid in a liquid phase returning from the condensers may return via the risers, in other embodiments the cooled fluid in the liquid phase may return via separate condensate return tubes. The fluid may return from the heat-exchanging condensers via gravity or via surface tension forces, such as capillary grooves or a wicking system.

The heat-exchanging condensers may be configured to dissipate heat using any of a wide variety of systems and methods configured to quickly dissipate heat. Both active and passive heat exchangers are within the scope of the present disclosure. In many of the illustrated examples, a passive fin-type heat exchanger is shown. In such embodiments, the fins increase the surface area of the condenser in order to increase the rate of heat dissipation to a surrounding medium, such as air or water. In other embodiments, active heat exchangers may be employed, such as those that incorporate electric fans, pumped water-cooling, vapor-compressing refrigeration systems, shell and tube heat exchangers, phase-change heat exchangers, etc. In some embodiments, a wall or surface of a gas transport tube and/or a cooling tube may serve as the heat-exchanging condenser.

The heat-exchanging condensers may be positioned above or belowground and may be in direct contact with a ground material. The heat-exchanging condensers may be configured to dissipate heat into a geological feature, such as an underground water source or material capable of dissipating heat relatively quickly. Heat-exchanging condensers and/or the risers connecting them to the gas transport tube and/or the cooling tube may be positioned at local elevational maximums in order for the fluid in a gaseous phase to more readily rise to the heat-exchanging condensers.

A cooling system may include a cooling tube at least partially filled with a fluid connected to a gas transport tube via one or more risers. Fluid within the cooling tube may absorb heat from a subterranean power line. As the temperature of fluid increases, it may change from a liquid phase to a gaseous phase. The fluid in the gaseous phase may rise through the riser(s) to the gas transport tube. The fluid in the gaseous phase may distribute itself throughout the gas transport tube to one or more fluidly connected heat-exchanging condensers. In some embodiments, the heat-exchanging condensers may be connected to the gas transport tube via one or more condenser risers. As previously described, the fluid in a liquid phase returning from the heat-exchanging condensers may return via the risers and/or through dedicated condensate return tubes. Fluid in a liquid phase may be transported within the cooling tube by passive methods such as by gravity or by surface tension or wicking forces. In other embodiments, active transport may be used, such as pumps; these may be powered by electrical energy derived from the power line.

The number of sections of cooling tubes may be varied based on the specific configuration and installation characteristics of the subterranean power line. For example, a subterranean power line with large variations in elevation or burying depth may be cooled by more than one section of independent cooling tubes. The number of heat-exchanging condensers, risers, gas transport tube sections, condenser risers, and other components of the systems described herein may be varied and adapted for a specific application. It will be apparent to one of skill in the art that replications of one or more components described in the present disclosure may be useful or advantageous in specific embodiments. For example, it may be useful to include numerous heat-exchanging condensers or numerous risers attached to the same heat-exchanging condenser.

In various embodiments, the fluid may comprise one or more immiscible or miscible fluids. For example, the fluid may comprise one or more of water, alcohol, mercury, sodium chloride, silicon oil, a solution of calcium chloride, a solution of sodium sulfate decahydrate, a hydrocarbon oil, and/or other liquid or heat transfer fluid. The fluid may normally be a solid, liquid, or gas at SATP, but pressurized (or depressurized) within the cooling tube until it is a liquid at standard temperature. The fluid or mixture of fluids may be selected based on a desired enthalpy of vaporization, thermal expansion coefficient, heat capacity, thermal conductivity, vaporization pressure at a specified temperature, vaporization temperature at a specified pressure, and/or other thermodynamic condition.

A storage tank fluidly connected to the cooling tube may electromechanically provide reserved fluid to the cooling tube as needed. The storage tank and the cooling tube may be maintained at independent pressures, temperatures, volumes, and/or maintain the fluid in different phases (e.g., solid, liquid, or gas). In some embodiments, in which the fluid comprises water, the storage tank may be automatically replenished via groundwater, rainwater, river water, lake water, or other water source.

According to various embodiments, information associated with the cooling system is transmitted to a data receiving location. In some embodiments, the cooling system may be monitored and/or controlled from a remote location based on the transmitted data. The data may be monitored and/or collected by any of a wide variety of computer and/or storage systems. The data may include information associated with any of a wide variety of external conditions, such as a temperature of a ground material, a temperature associated with the heat-exchanging condenser, a temperature associated with the power line, a temperature and/or pressure associated with the cooling tube and/or the fluid, and/or a characteristic associated with a storage tank or a pressure regulation system. The data may be transmitted wirelessly, via a wire, or via an optical data connection to a data receiving location. In some embodiments, the data may be transmitted using the power line.

Some of the infrastructure that can be used with embodiments disclosed herein is already available, such as: general-purpose computers to monitor and/or control pressure and other characteristics of a cooling system, computer programming tools and techniques, digital storage media, and communication networks. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The term Standard Ambient Temperature and Pressure (SATP) as used herein refers to the commonly used standard temperature of 298.15 K (25° C., 77° F.) and an absolute pressure of 100 kPa (14.504 psi, 0.986 atm). Accordingly, the standard temperature as used herein is 298.15 K (25° C., 77° F.) and the standard pressure as used herein is an absolute pressure of 100 kPa.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates an embodiment of underground power transmission system 100 including a cooling system 150 configured to absorb and dissipate heat generated by a subterranean power line 110. As illustrated, the power line 110 may extend belowground 101 along a first path. Backfill material 105 may be removed from the ground 101 in order to create a trench in which the power line 110 may be installed. The power line may include a conductive core 111 and an exterior insulation layer 112. As previously described, as current flows through the power line 110, resistive heating may cause the power line 110 to increase in temperature. The heat may be dissipated into the backfill material 105 and the ground 101. In many instances, the surrounding ground 101 and backfill material 105 may not sufficiently dissipate the heat. The power line 110 may overheat, decreasing efficiency and/or causing damage to the power line 110 and/or the surrounding landscape.

Accordingly, a cooling system 150 may be installed adjacent to the power line 110. The cooling system 150 may include a cooling tube 155 extending along the first path and adjacent to the power line 110. The cooling tube 155 may be in direct contact with the power line 110, or there may be a gap between the cooling tube 155 and the power line 110. The cooling tube 155 may be installed before, concurrently, or after the installation of the power line 110.

The cooling tube 155 may be constructed of any of a wide variety of materials, including PVC, ABS, PP, PE, PVDF, a metal, and/or other suitable material. The cooling tube 155 may be configured to house a fluid 165. The fluid 165 may comprise one or more immiscible or miscible fluids. For example, the fluid 165 may comprise one or more of water, alcohol, mercury, sodium chloride, silicon oil, a solution of calcium chloride, a solution of sodium sulfate decahydrate, a hydrocarbon oil, and/or other liquid or heat transfer fluid. The fluid 165 may be a liquid at the standard temperature within the cooling tube 155. This may be due, in part, to the (negative or positive) pressure within the cooling tube 155. The fluid 165 may be selected based on a desired enthalpy of vaporization, thermal expansion coefficient, heat capacity, thermal conductivity, vaporization pressure at a specified temperature, vaporization temperature at a specified pressure, and/or other thermodynamic condition for the specific application.

At least some of the heat generated by the power line 110 may be radiated and/or conducted to the cooling tube 155. The fluid 165 within the cooling tube 155 may absorb the heat. As the fluid 165 heats up, the fluid 165 may change phase from a liquid to a gas. The hot gas may rise to a heat-exchanging condenser 160. The heat-exchanging condenser 160 may dissipate the heat stored in the fluid 165 and condense the fluid 165 back into a liquid. The cooled liquid fluid 165 may return from the heat-exchanging condenser 160 to the cooling tube 155. The heat-exchanging condensers 160 are illustrated as passive fin-type heat exchangers. In alternative embodiments, the heat-exchanging condensers 160 may incorporate any of a wide variety of active or passive heat exchangers.

FIG. 1B Illustrates an embodiment of the fluid 165 within the cooling tube 155 changing phase from a liquid fluid 165 to a gaseous fluid 166 as it absorbs heat generated by the power line 110. The gaseous fluid 166 may rise within the cooling tube 155 to the heat-exchanging condensers 160. As previously described, the heat-exchanging condensers 160 may be configured to dissipate heat using any of a wide variety of systems and methods, including both active and passive heat exchangers. The illustrated fins of the heat-exchanging condensers 160 may increase the surface area of the condenser in order to more quickly dissipate the heat generated by the power line 110. In other embodiments, active heat exchangers may be employed, such as electric fans, pumped water-cooling, vapor-compressing refrigeration systems, shell and tube heat exchangers, phase-change heat exchangers, etc. In some embodiments, fins may be built into the wall or ceiling of cooling tube 155. In some embodiments, the gaseous fluid 166 may be configured to rise into the fins of the heat-exchanging condensers 160.

In some embodiments, the fins of the heat-exchanging condensers 160 may be positioned belowground and configured to dissipate the heat into the surrounding ground 101. The increased surface area of the fins may increase the rate of heat dissipation. In other embodiments, the fins of the heat-exchanging condensers 160 may be positioned aboveground and configured to dissipate heat into the atmosphere. In such embodiments, all or part of the heat-exchanging condensers 160 may be positioned aboveground.

FIG. 1C illustrates the cooling system 150 including risers 170 connecting the cooling tube 155 to the heat-exchanging condensers 160. In the illustrated example, the cooling tube 155 is positioned belowground at about the same elevation as the power line 110. The risers 170 fluidly connect the cooling tube 155 to the heat-exchanging condensers 160. As fluid 165 in a liquid phase absorbs heat generated by a current flow through the power line 110, the fluid 165 may change phase to a fluid 166 in a gaseous phase. The gaseous fluid 166 may travel through the risers 170 to cool and condense as the heat is dissipated via the heat-exchanging condensers 160. In the illustrated embodiment, the cooling tube 155 and at least part of the risers 170 may be positioned belowground. Part of the risers 170 and heat-exchanging condensers 160 may be positioned aboveground.

The risers 170 may be any length useful to allow the fluid 166 in the gaseous phase to rise from the subterranean cooling tube 155 to aboveground heat-exchanging condensers 160 positioned aboveground. Positioning the heat-exchanging condensers 160 aboveground may increase the rate of heat dissipation, and thus the effectiveness of the cooling system 150. In the illustrated embodiments, the relative size of various components is for illustrative purposes only. For example, the diameter of the power line 110 in the figures relative to the volume of cooling system 150 may be exaggerated for clarity. Moreover, the relative sizes of the power line 110, the cooling tube 155, the risers 170, and/or the heat-exchanging condensers 160 may be adapted for a particular application.

Figure 1D:
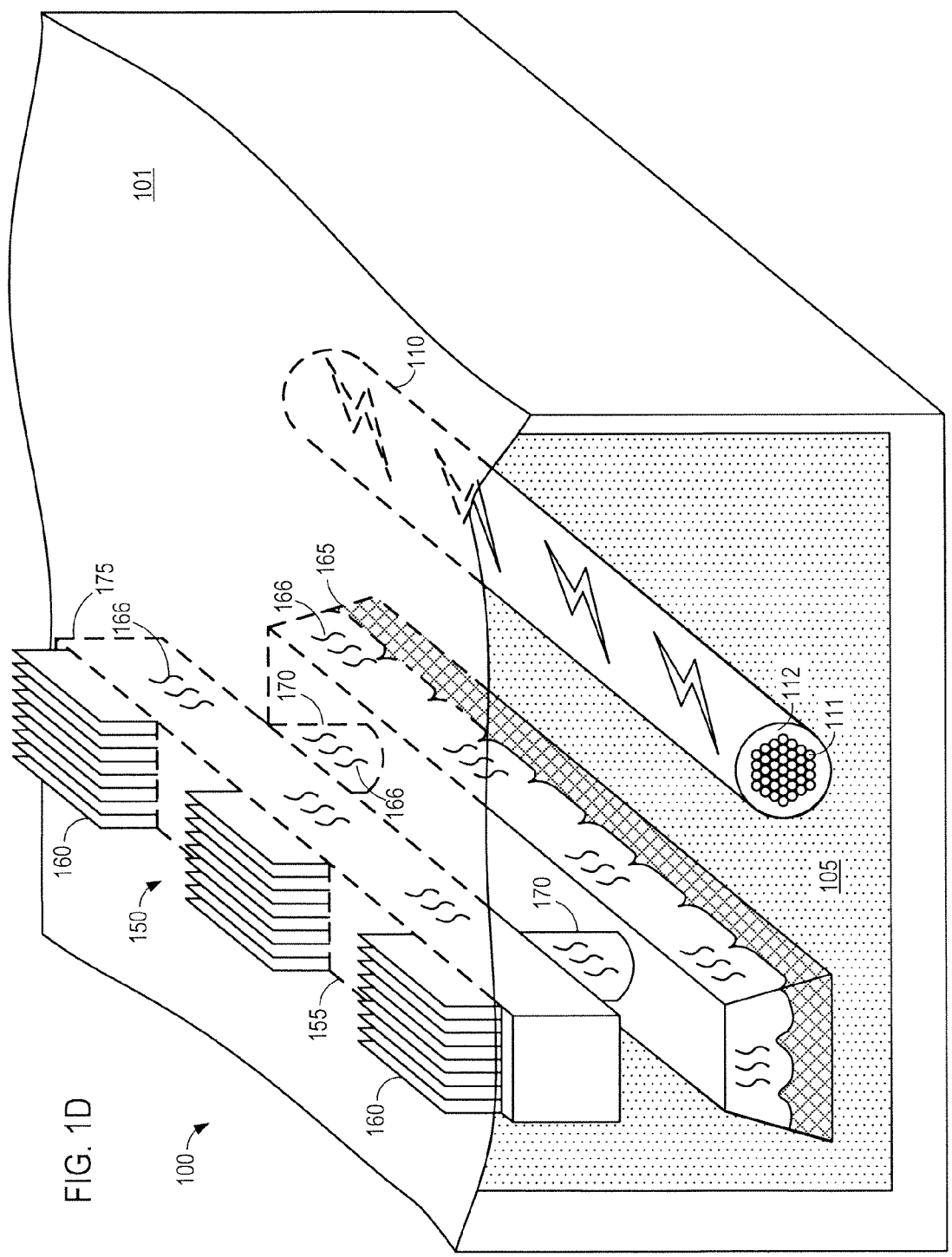
FIG. 1D illustrates a cooling system including risers connecting the cooling tube to a gas transport tube, which is then connected to the heat-exchanging condensers.

FIG. 1D illustrates the cooling system 150 including risers 170 connecting the cooling tube 155 to a gas transport tube 175, which is then connected to the heat-exchanging condensers 160. In the illustrated embodiment, as the fluid 165 in the liquid phase absorbs heat it undergoes a phase change to become a fluid 166 in a gaseous phase. The gaseous fluid 166 may rise through the risers 170 to the gas transport tube 175. The gas transport tube 175 may evenly distribute the relatively hot gaseous fluid 166 to the various heat-exchanging condensers 160.

Any number of risers 170 and heat-exchanging condensers 160 may be used in conjunction with the cooling systems 150 described herein. The number of risers 170 need not correspond to the number of heat-exchanging condensers 160. Accordingly, in some embodiments, a single riser 170 may be positioned on a local elevational maximum along the cooling tube 155 and configured to transport all the heated gaseous fluid 166 to a gas transport tube 175. The gas transport tube 175 may then distribute the heated gaseous fluid 166 to one or more heat-exchanging condensers 160.

As illustrated in FIG. 1D, the power line 110 may be relatively deep underground and the cooling tube 155 may be positioned at approximately the same depth, or alternatively above or below the power line 110. The risers 170 and/or the gas transport tube 175 may also be underground or at least partially underground. The heat-exchanging condensers 160 may include fins that are disposed aboveground to dissipate heat more quickly.

Figure 1E:
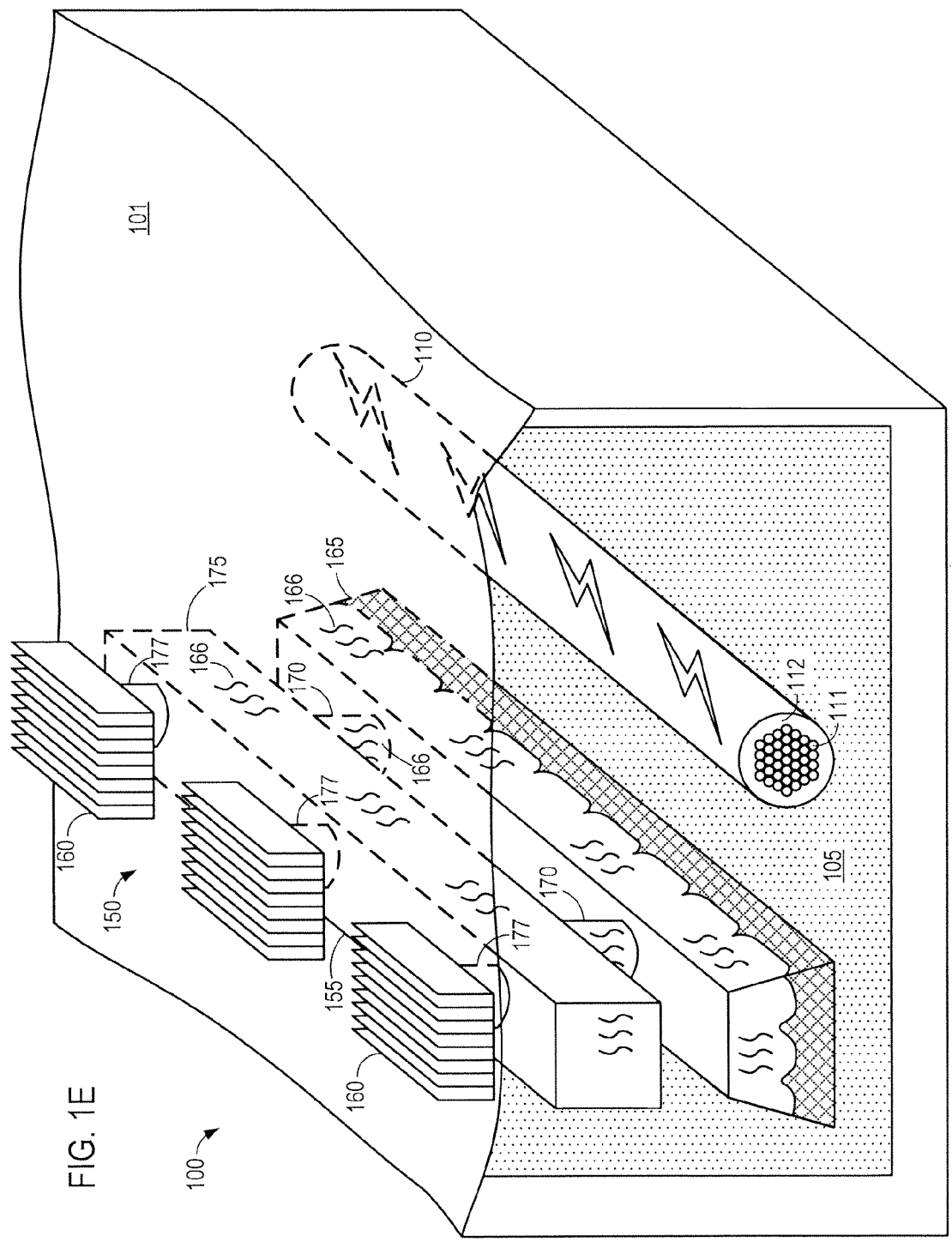
FIG. 1E illustrates yet another embodiment in which risers connect the cooling tube to a gas transport tube and condenser risers connect the gas transport tube to the heat-exchanging condensers.

FIG. 1E illustrates yet another embodiment in which the power line 110 and the cooling tube 155 are underground. Risers 170 may fluidly connect the cooling tube 155 to the gas transport tube 175, which may also be underground. Condenser risers 177 may fluidly connect the subterranean gas transport tube 175 to aboveground heat-exchanging condensers 160. Accordingly, liquid fluid 165 may absorb heat generated by a current flow through the power line 110 and change phase to a gaseous fluid 166. The heated gaseous fluid 166 may rise through the risers 170 to the gas transport tube 175. The heated gaseous fluid 166 may be dispersed within the gas transport tube 175 and rise up the condenser risers 177 to the heat-exchanging condensers 160. The heat-exchanging condensers 160 may disperse the heat within the gaseous fluid 166 and the gaseous fluid 166 may undergo a phase change and revert back to a liquid fluid 165. The cooled liquid fluid 165 may return to the cooling tube 155.

Figure 2:
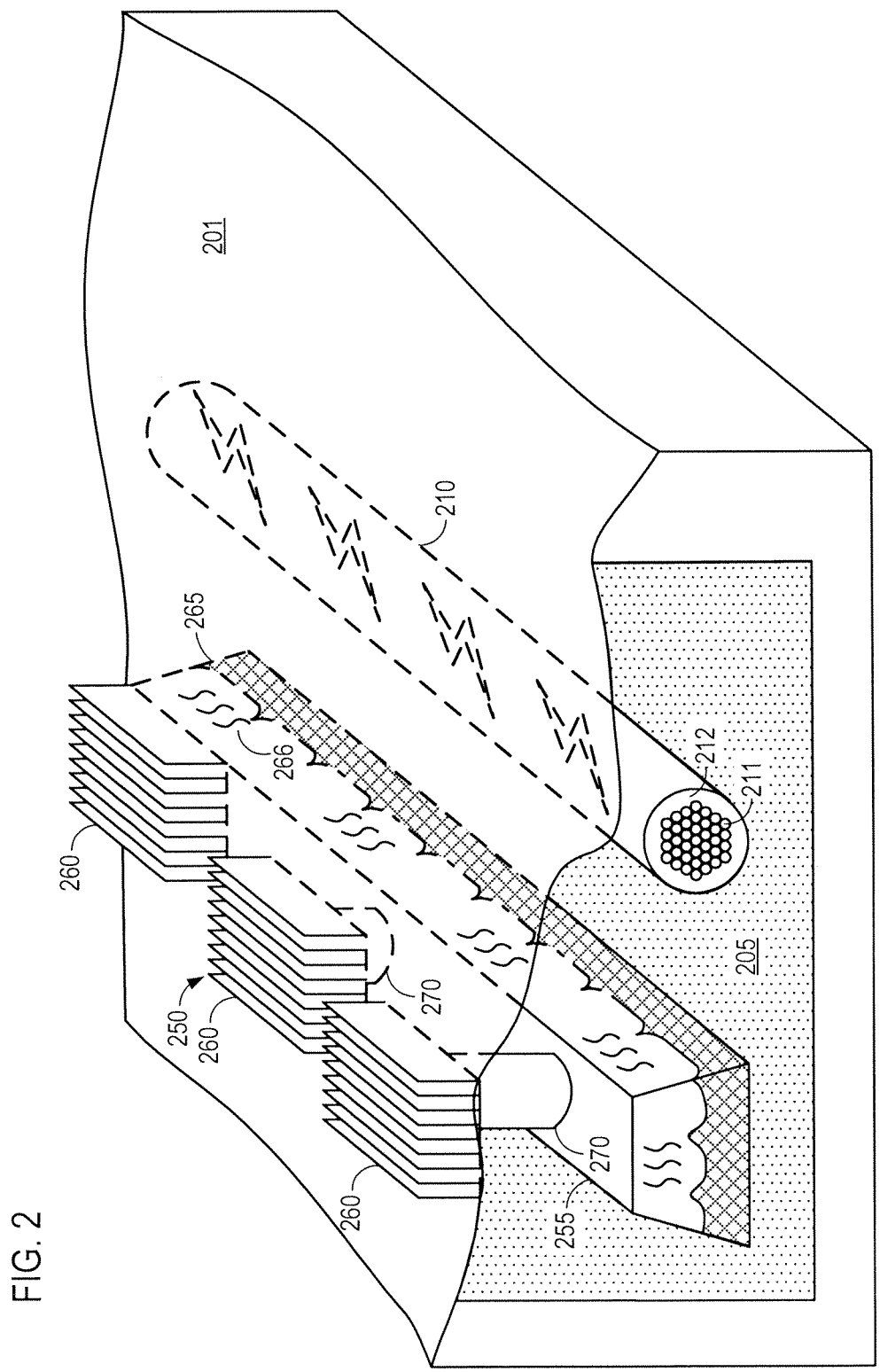
FIG. 2 illustrates various possible height configurations of heat-exchanging condensers.

FIG. 2 illustrates various possible height configurations of heat-exchanging condensers 260. As illustrated, a subterranean power line 210 may include a conductive core 211 and an exterior insulation layer 212. Backfill material 205 may be removed from the ground 201 to create a trench in which the power line 210 and the adjacent cooling tube 255 may be installed. Similar to previously described embodiments, heat generated by the power line 210 may be absorbed and dissipated by the cooling system 250. The cooling system 250 may include the cooling tube 255, the risers 270, and the heat-exchanging condensers 260.

A fluid 265 within the cooling tube 255 may absorb heat generated by the current flow through the power line 210. The fluid 265 may change phase from a liquid fluid 265 to a gaseous fluid 266. The hot gaseous fluid 266 may cool and condense as the heat-exchanging condensers 260 dissipate the heat stored within the hot gaseous fluid 266. As illustrated in FIG. 2, the cooling system 250 may include various configurations of heat-exchanging condensers 260.

Heat-exchanging condensers 260 may be underground (not illustrated), partially aboveground and directly connected to the cooling tube 255, partially aboveground connected to the cooling tube 255 via a riser 270, and/or fully aboveground connected to the cooling tube 255 via riser 270. Again, the heat-exchanging condensers 260 are illustrated as passive fin-type heat exchangers. In alternative embodiments, heat-exchanging condensers 260 may incorporate any of a wide variety of active or passive heat exchangers.

Similar to previously described embodiments, cooling tube 255 may be constructed of any of a wide variety of materials, including PVC, ABS, PP, PE, PVDF, a metal, and/or other suitable material. The fluid 265 may comprise one or more immiscible or miscible fluids. For example, the fluid 265 may comprise one or more of water, alcohol, mercury, sodium chloride, silicon oil, a solution of calcium chloride, a solution of sodium sulfate decahydrate, a hydrocarbon oil, and/or other liquid or heat transfer fluid. The fluid 265 may be a liquid at the standard temperature within the cooling tube 255. This may be due, in part, to the pressure within the cooling tube 255. That is, the cooling tube 255, and fluidly connected components, such as the risers 270 and/or the heat-exchanging condensers 260, may be positively or negatively pressurized. The fluid 265 may be selected based on a desired enthalpy of vaporization, thermal expansion coefficient, heat capacity, thermal conductivity, vaporization pressure at a specified temperature, vaporization temperature at a specified pressure, and/or other thermodynamic condition for the specific application.

Figure 3A:
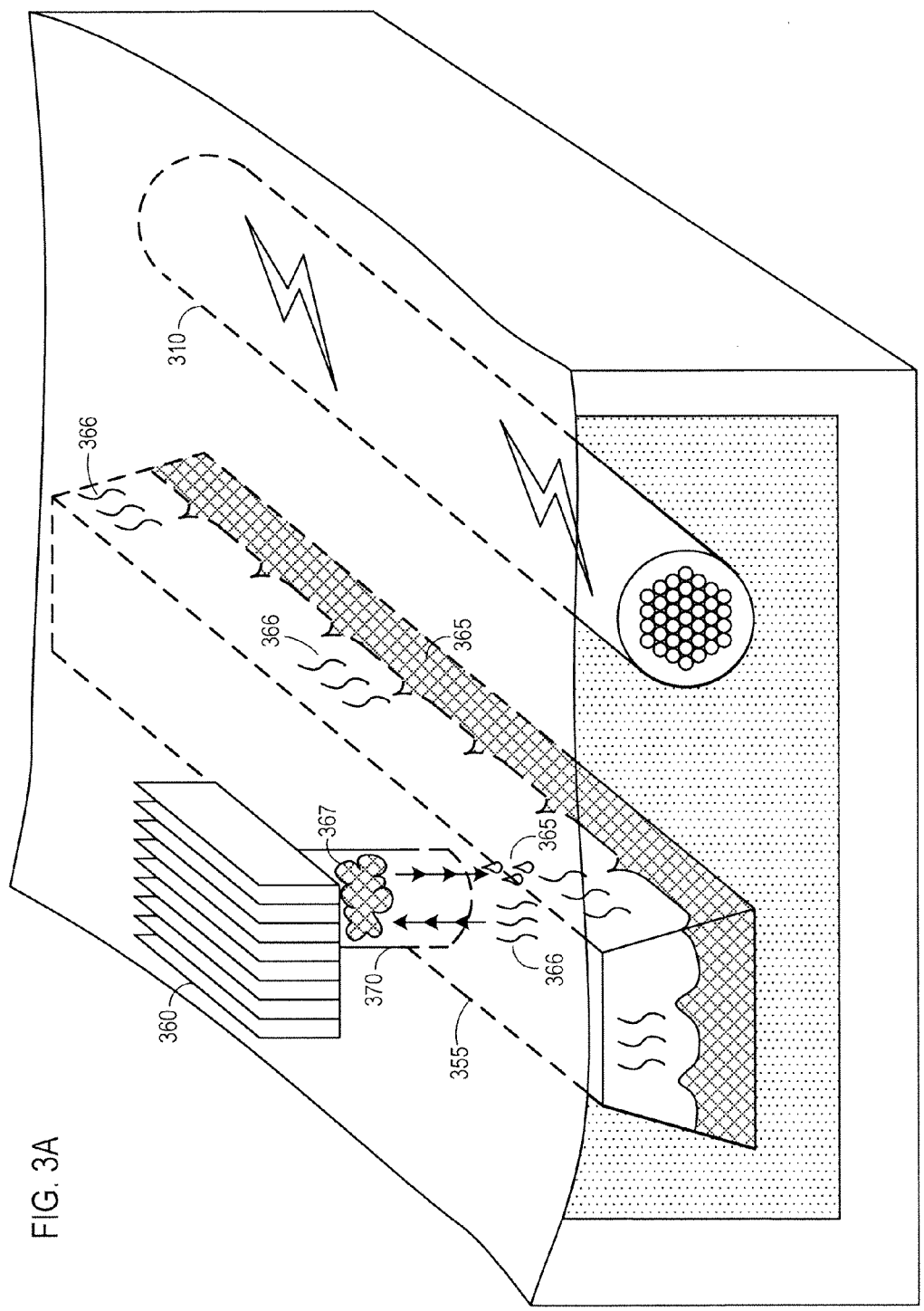
FIG. 3A illustrates an embodiment of a fluid in a liquid phase absorbing heat generated by a subterranean power line, the fluid undergoing a phase change to a gaseous phase, the fluid rising to a heat-exchanging condenser, cooling, and returning to the cooling tube as a liquid.
Figure 3B:
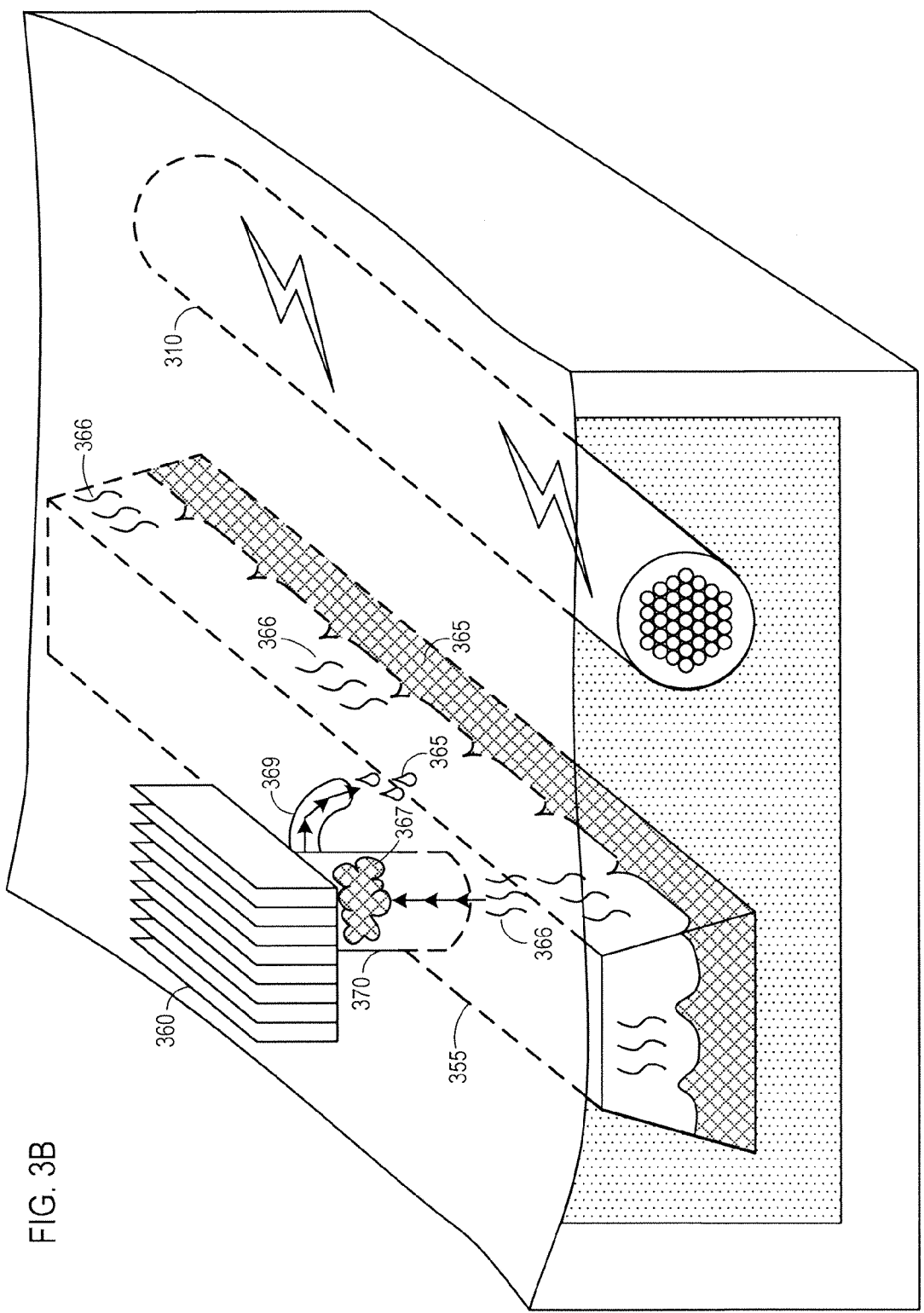
FIG. 3B illustrates an embodiment in which the condensed liquid fluid from the heat-exchanging condenser returns to the cooling tube via a condensate return tube.

FIG. 3A illustrates an embodiment a fluid 365 in a liquid phase absorbing heat generated by a subterranean power line 310. As illustrated, the liquid fluid 365 in a cooling tube 355 undergoes a phase change as it absorbs heat and becomes a heated gaseous fluid 366. The heated gaseous fluid 366 rises up a riser 370 to a heat-exchanging condenser 360. The heat stored within the gaseous fluid 366 is absorbed and dissipated by the heat-exchanging condenser 360, causing the fluid to condense 367 and return as a liquid to the cooling tube 355. As illustrated in FIG. 3A, the condensate fluid 367 may return to the cooling tube 355 the same way it arrived. Specifically, the condensate fluid 367 may return to the cooling tube 355 via the riser 370. FIG. 3B illustrates an alternative embodiment in which the condensate fluid 367 returns from the heat-exchanging condenser 360 via a condensate return tube 369.

Figure 4A:
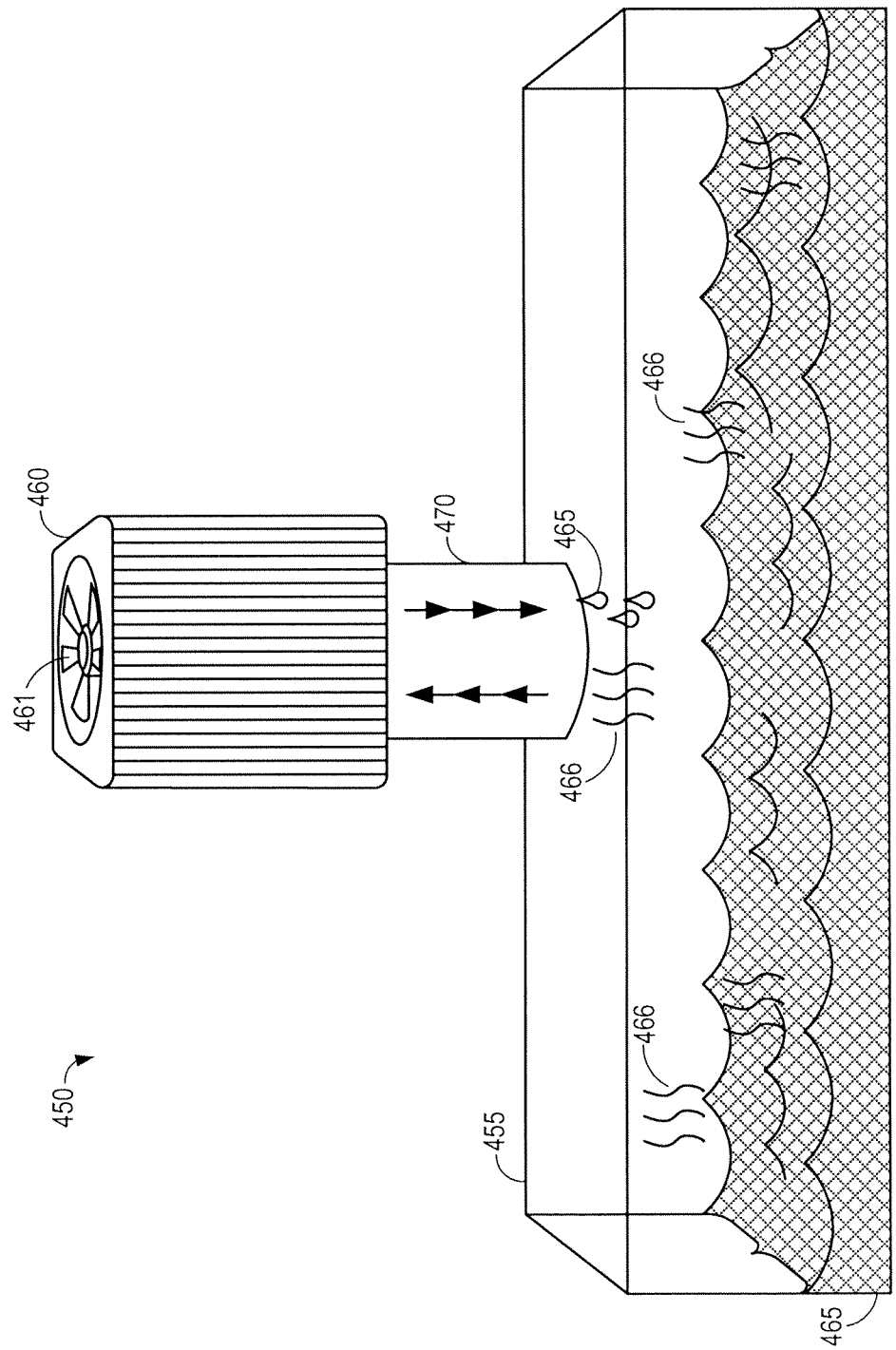
FIG. 4A illustrates an embodiment of the cooling tube connected to an active heat-exchanging condenser via a riser.

FIG. 4A illustrates an embodiment of a cooling tube 455 connected to an active heat-exchanging condenser 460 via a riser 470. The shape, size, and/or dimensions of the cooling tube 455 may be adapted for a specific application. For instance, throughout the figures, cooling tubes, such as cooling tube 455, are shown as rectangular prisms. However, it will be appreciated that cooling tubes of any shape, including cylindrical, may be used in conjunction with the various embodiments described herein. Similarly, the illustrated ratio of the fluid 465 to the volume of the cooling tube 455 is merely illustrative. The amount of fluid 465 within the cooling tube 455 may be adapted and adjusted for a particular application. Moreover, the relative size of various components of cooling system 450 may be adapted for a particular application.

The fluid 465 within the cooling tube 455 may absorb heat generated by a current flow through a power line (not illustrated). The fluid 465 may change phase from a liquid fluid 465 to a gaseous fluid 466. Heat-exchanging condensers 460 may cool and condense the hot gaseous fluid 466. As illustrated in FIG. 4, a riser 470 may feed the hot gaseous fluid 466 to an active heat-exchanging condenser 460. The exemplary active heat-exchanging condenser 460 includes a fan 461. The sides of the active heat-exchanging condenser 460 may include various channels designed to increase the surface area of the active heat-exchanging condenser 460. Moreover, in some embodiments, the active heat-exchanging condenser 460 may incorporate pumped water-cooling, a vapor-compressing refrigeration system, a shell and tube heat exchanger, a phase-change heat exchanger, and/or other active heat-exchanging technology.

The heated gaseous fluid 466 may cool and condense within or on the active heat exchanger 460. The condensate (liquid fluid drops 465) may return to the cooling tube 455. Similar to previously described embodiments, the cooling tube 455, the riser 470, and/or portions of the active heat-exchanging condenser 460 may be constructed of any of a wide variety of materials, including PVC, ABS, PP, PE, PVDF, a metal, and/or other suitable material. As previously described, any number of active heat-exchanging condensers 460 may be employed, as illustrated in FIG. 4B.

FIG. 4B illustrates the cooling tube 455 of FIG. 4A with an additional riser 470 and an additional active heat-exchanging condenser 460. The number of active (or passive) heat-exchanging condensers 460 employed may depend on the amount of heat generated by a power line, the ambient temperature of the ground and/or the atmosphere associated with the active heat-exchanging condenser, and/or other external conditions.

Figure 5:
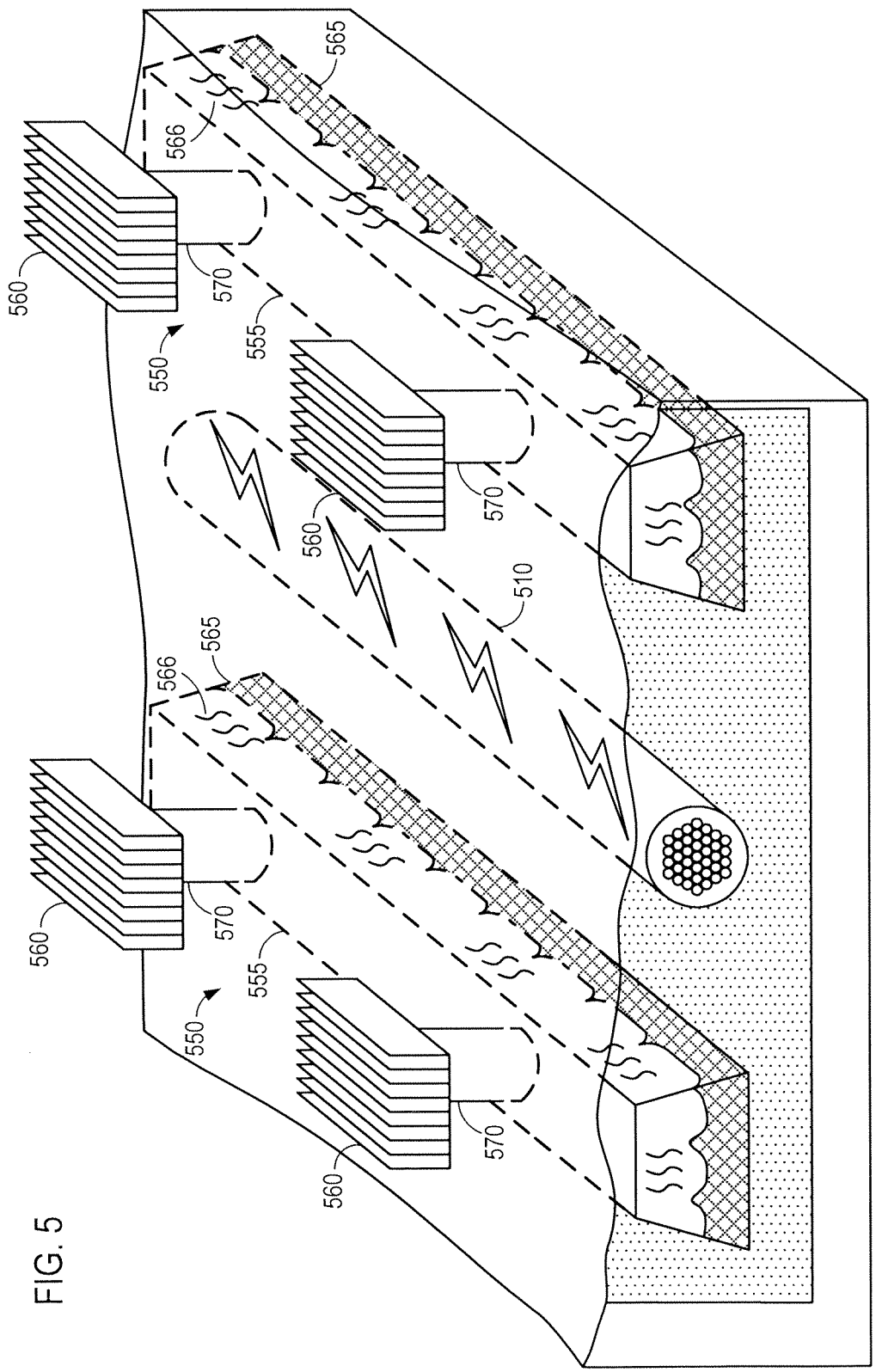
FIG. 5 illustrates an embodiment of a cooling system including two cooling tubes on opposing sides of a subterranean power line configured to absorb and dissipate heat generated by the power line.

FIG. 5 illustrates an embodiment of a cooling system 550, including two cooling tubes 555 on opposing sides of a subterranean power line 510, each configured to absorb and dissipate heat generated by the power line 510. In various embodiments, a power line may generate sufficient thermal energy to warrant the usage of two or more independent (or, alternatively, fluidly connected) cooling tubes 555. The dual cooling tube embodiment illustrated in FIG. 5 is similar to the cooling system 150 described in conjunction with FIG. 1C, replicated twice in order to provide additional cooling and/or redundancy. Accordingly, the illustrated cooling system 550 includes risers 570 connecting the cooling tubes 555 to the heat-exchanging condensers 560. The cooling tubes 555 may be positioned belowground at about the same elevation as the power line 510. In alternative embodiments, the cooling tubes 555 may be at lower or higher elevations than the power line 510. The risers 570 may fluidly connect the cooling tubes 555 to the heat-exchanging condensers 560. As fluids 565 in a liquid phase within each cooling tube 555 absorb heat generated by a current flow through the power line 510, the fluids 565 may change phase to fluids 566 in a gaseous phase. The gaseous fluids 566 may travel through the risers 570 to cool and condense as the heat-exchanging condensers 560 dissipate the heat. In the illustrated embodiment, the cooling tubes 555 and at least part of the risers 570 may be positioned belowground. Part of the risers 570 and heat-exchanging condensers 560 may be positioned aboveground. The risers 570 may be any length useful to allow the fluids 566 in the gaseous phase to rise from the subterranean cooling tubes 555 to the aboveground heat-exchanging condensers 560.

Figure 6:
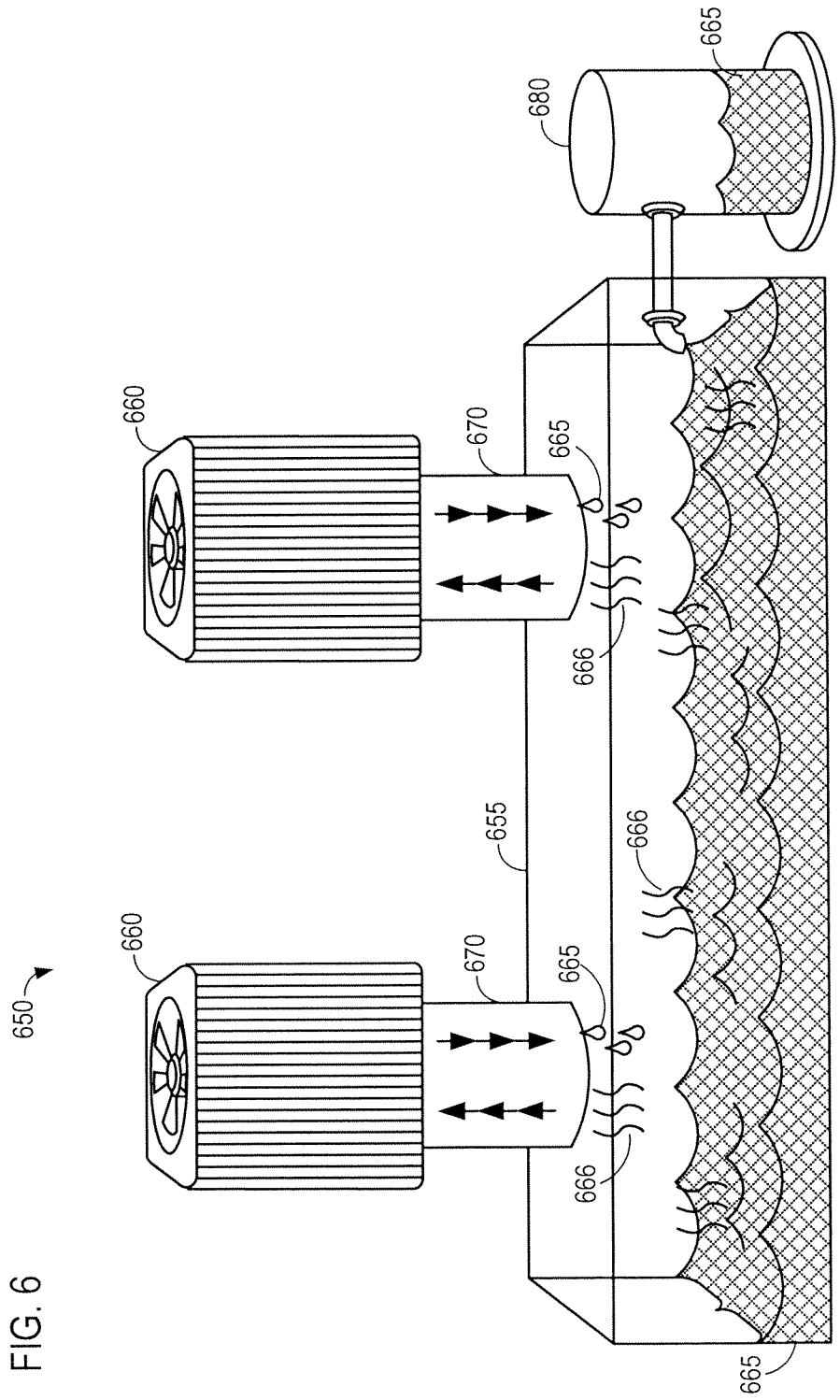
FIG. 6 illustrates an embodiment of a section of a cooling system including a storage tank configured to supply additional fluid as needed to the cooling system.

FIG. 6 illustrates an embodiment of a section of a cooling system 650, including a storage tank 680 configured to supply additional fluid 665 to the cooling tube 655. In some embodiments, some of the gaseous fluid 666 and/or liquid fluid 665 may escape the cooling system 650. In other embodiments, cooling tube 655 may be a sealed system in which the fluid 665 within the cooling tube 655 is recycled between a cool liquid phase 665, a heated gaseous phase 666, and a condensate liquid phase 665 returning from the heat-exchanging condensers 660 via risers 670. However, if the cooling system 650 is imperfectly sealed and/or develops a leak, some of the liquid fluid 665 and/or the gaseous fluid 666 may escape. In the various embodiments, the storage tank 680 may be configured to refill the cooling tube 655 to the proper amount. Storage tank 680 may include one or more controllers (not illustrated) configured to electronically, mechanically, or electromechanically determine how much additional fluid 665 is needed and automatically refill the cooling tube 655. In some cases, fluid may be removed from the cooling tube and either discharged to the environment or delivered to the storage tank.

The storage tank 680 and the cooling tube 655 may be maintained at independent pressures, temperatures, volumes, and/or maintain the fluid 665 in different phases (e.g., solid, liquid, or gas). In some embodiments in which the fluid 665 comprises water, the storage tank 680 may be automatically replenished via groundwater, rainwater, river water, lake water, or other water source.

Figure 7:
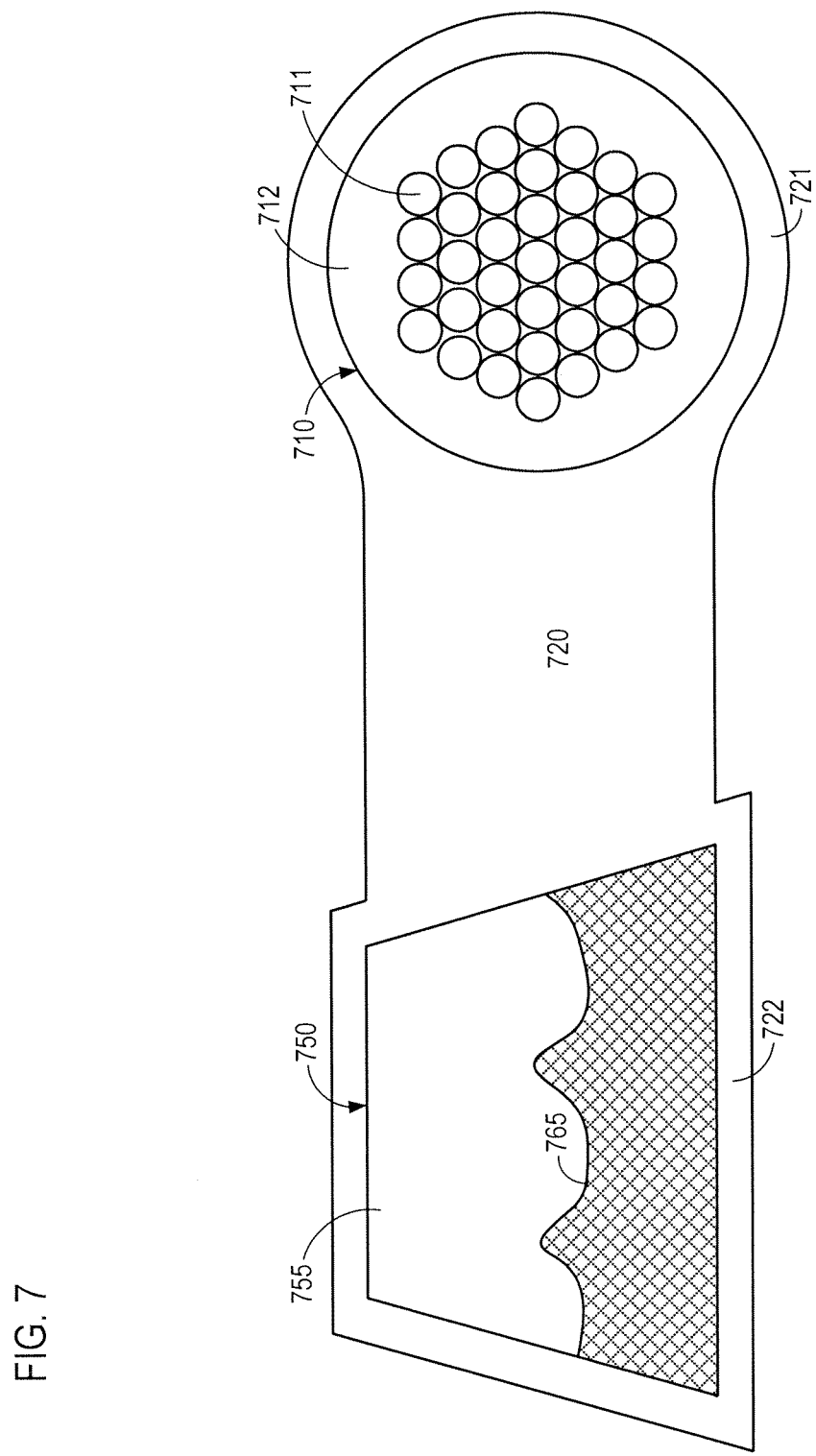
FIG. 7 illustrates a cross-sectional view of an embodiment of a cooling tube connected via a connecting member to a subterranean power line.

FIG. 7 illustrates a cross-sectional view of an embodiment of a cooling system 750 including a cooling tube 755 filled with a fluid 765, connected via a connecting member 720 to a subterranean power line 710. The fluid 765 may be configured to absorb and dissipate heat generated by a current drawn through the conductive core 711 of the power line 710. As illustrated, a gap may separate the cooling tube 755 from the exterior insulation layer 712 of the power line 710. The connecting member 720 may include a portion 721 configured to secure the power line 710 and a portion 722 configured to secure the cooling tube 755. A length of the power line 710 extending along a path underground may include one or more connecting members 720 connecting it to the cooling tube 755. In an alternative embodiment, the length of power line 710 extending along a path underground may include a continuous connecting member 720 connecting it to the cooling tube 755.

Figure 8:
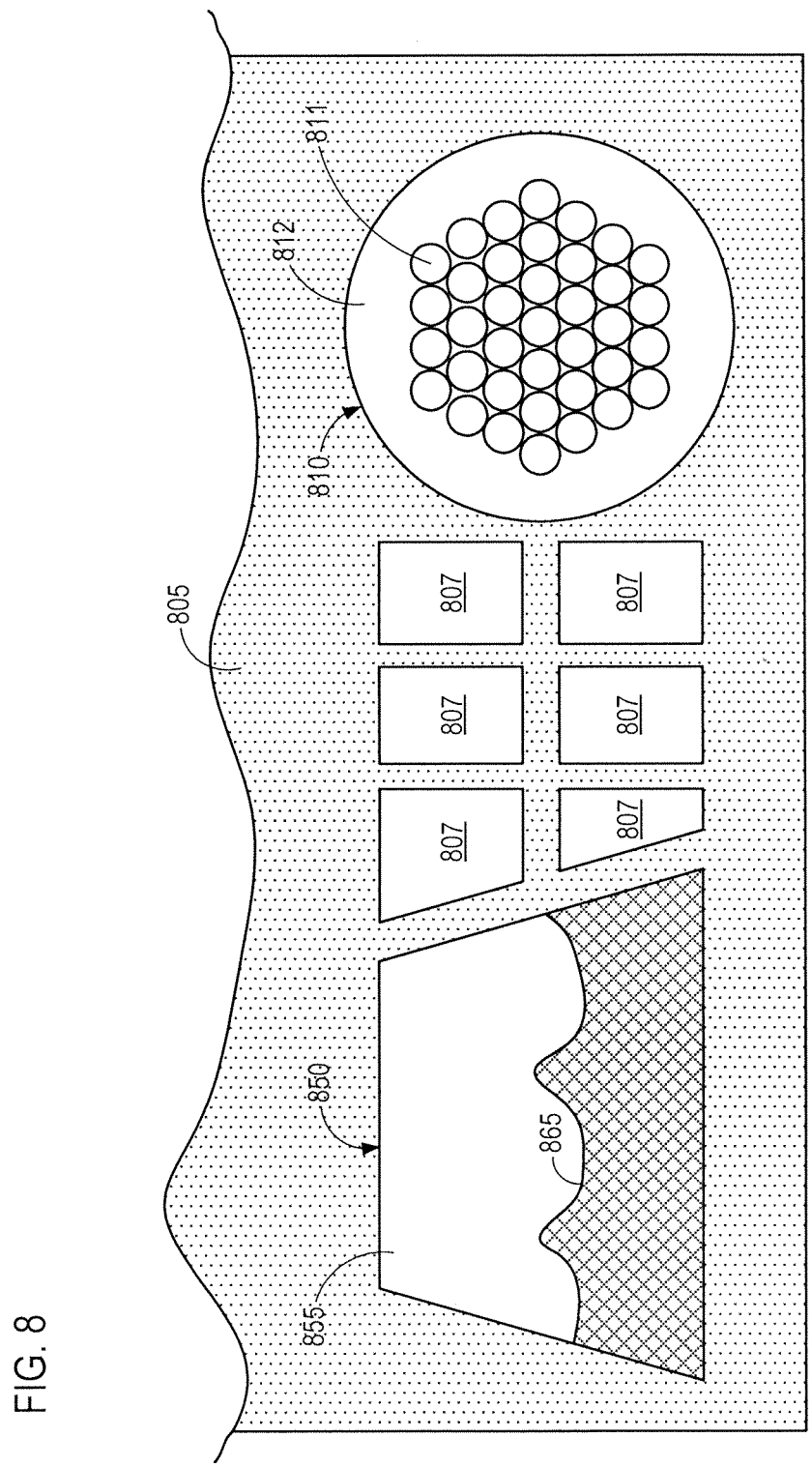
FIG. 8 illustrates a cross-sectional view of a thermal conductivity enhancer positioned in a gap between a cooling tube and a subterranean power line.

FIG. 8 illustrates a cross-sectional view of a thermal conductivity enhancer 807 positioned in the gap between a cooling tube 855 and a subterranean power line 810. Again, the power line 810 may include an exterior insulation layer 812 and a conductive core 811. The adjacent cooling system 850 may include a cooling tube 855 housing a fluid 865. The fluid 865 may be configured to absorb heat generated by a current drawn through the conductive core 811 of the power line 810. The ground material 805 separating the cooling tube 855 from the power line 810 may conduct a limited amount of heat. Accordingly, a thermal conductivity enhancer 807 may be positioned in the gap between the cooling tube 855 and the power line 810.

The thermal conductivity enhancer 807 may comprise multiple components, as illustrated in FIG. 8. Alternatively, the thermal conductivity enhancer 807 may be a single continuous piece. The thermal conductivity enhancer 807 may comprise sand, dirt, gravel, an adhesive, concrete, a metal, a metal mesh, and/or a high-K material. The cooling tube 855 and the power line 810 may be joined together (as illustrated in FIG. 7) via a connecting member (720 in FIG. 7) configured to enhance thermal conduction.

Figure 9A:
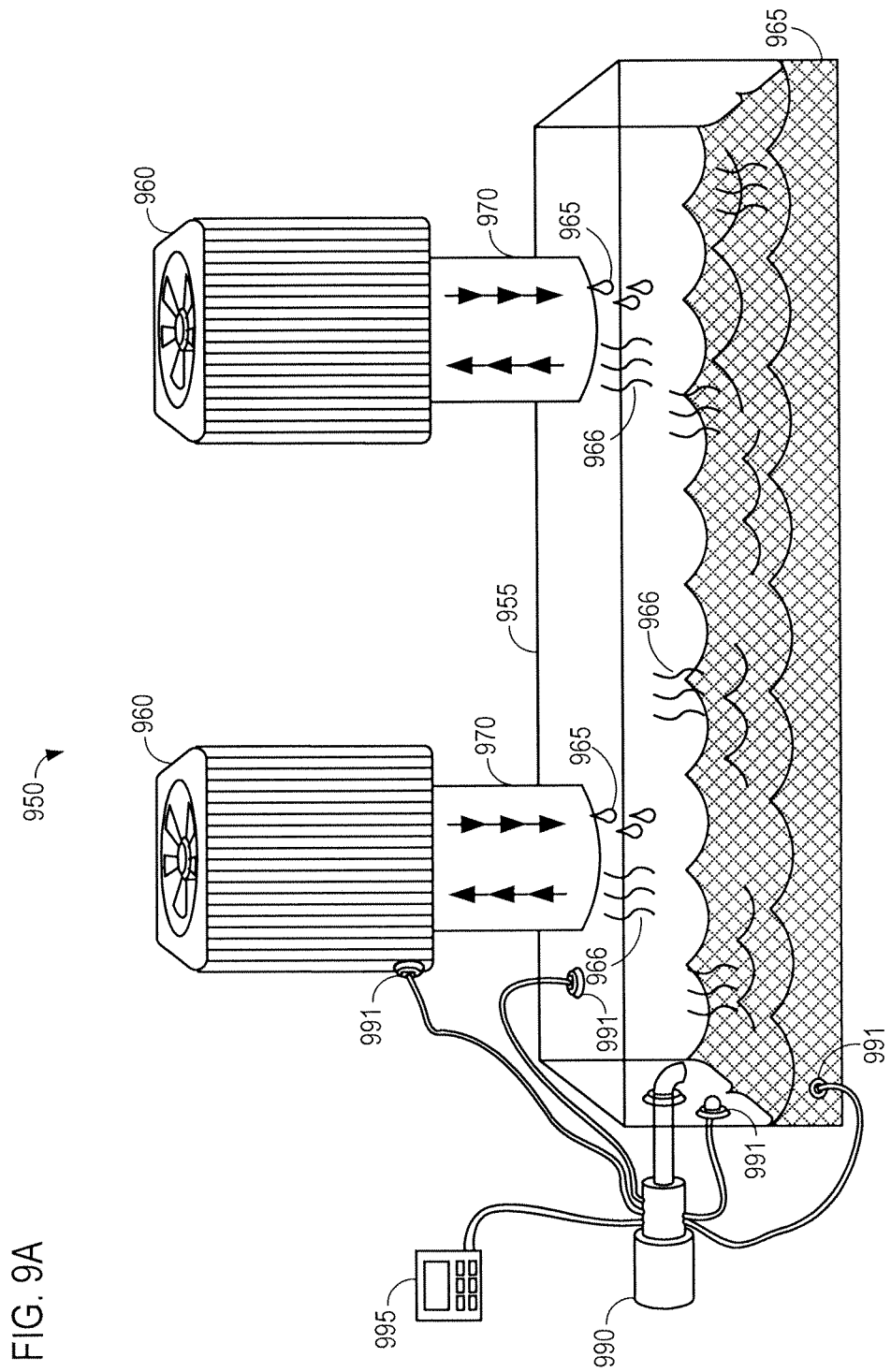
FIG. 9A illustrates an embodiment of a section of a cooling system including a pressure regulation system configured to maintain or dynamically adjust the pressure within the cooling tube.

FIG. 9A illustrates an embodiment of a section of a cooling system 950 including a pressure regulation system 990 configured to maintain or dynamically adjust the pressure within a cooling tube 955. As illustrated, the cooling system 950 may include a cooling tube 955 configured to house a liquid fluid

965. The liquid fluid 965 may be configured to absorb heat generated by a power line (not shown). As the liquid fluid 965 absorbs heat, it may change phase to a gaseous fluid 966. The heated gaseous fluid 966 may rise up the risers 970 to the heat-exchanging condensers 960. The heat-exchanging condensers 960 may dissipate the heat stored in the heated gaseous fluid 966 and the condensed liquid fluid 965 may return to the cooling tube 955.

As previously described, in some embodiments the fluid 965 and 966 may be maintained in a sealed system, in which the fluid recycles between liquid 965 and gaseous 966 phases as heat received by the cooling tube 955 is dissipated by the heat-exchanging condensers 960. Adjusting the pressure within the cooling tube 955 may control the vaporization temperature of the fluid 965. The vaporization temperature of the fluid 965 may directly affect the rate of heat transfer between the cooling tube 955 and the heat-exchanging condensers 960. The vaporization temperature of the fluid 965 may indirectly affect the rate of heat transfer between the power line and the cooling tube and/or the temperature of the power line. Accordingly, a pressure regulation system 990 may be configured to monitor various aspects (e.g., temperature, pressure, and/or quantities) associated with the cooling system 950 via sensors 991. A controller 995 may record and/or transmit the collected information. Additionally, the controller 995 (or a remote controller in communication with the controller 995) may utilize the pressure regulation system 990 to dynamically adjust the pressure within the cooling tube 955. The pressure may be adjusted based on current temperatures and/or pressures associated with the cooling system 950 and/or an associated power line (not shown).

The pressure regulation system 990 may be manually instructed to adjust the pressure or automatically adjust the pressure based on one or more conditions. For example, the pressure regulation system 990 may adjust the pressure to control a vaporization temperature of the fluid 965. The pressure regulation system 990 may based on a temperature of a ground material, an ambient air temperature near the heat-exchanging condensers 960, a power dissipation within a power line, a thermal resistance between the power line and the cooling tube, an ambient wind speed, a temperature of the power line, and/or a temperature of the fluid. Additionally or alternatively, the pressure within the cooling tube 955 may be adjusted based on a season, a time of day, an average current flow in the power line, and/or an instantaneous current flow in the power line.

Figure 9B:
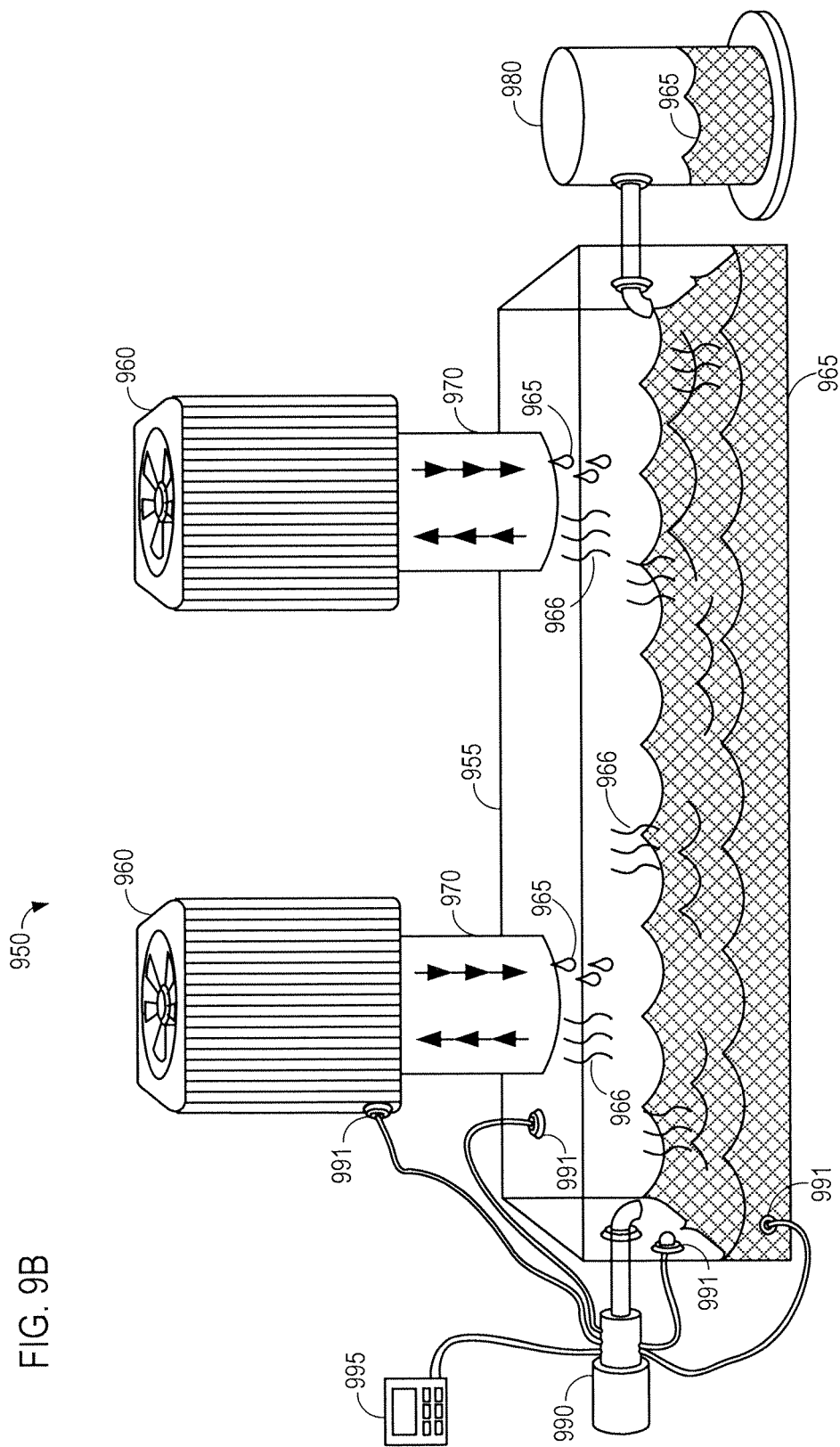
FIG. 9B illustrates an embodiment of a section of a cooling system including a pressure regulation system and a storage tank.

FIG. 9B illustrates a system similar to the embodiments described in conjunction with FIG. 9A, further including a storage tank 980. The pressure regulation system 990 may monitor a temperature associated with the cooling system 950 or the power line, a time, a pressure associated with the cooling system 950, an amount of fluid 965 in a gaseous phase, an amount of fluid 966 in a liquid phase, a load on the subterranean power line, etc. The pressure regulation system 990 may then dynamically adjust the internal pressure of the cooling tube 955 in order to control the vaporization and/or condensation temperature(s) of the fluid 965. The pressure regulation system 990 may control the pressure within the cooling tube 955 by adding a gas, liquid, or solid to the cooling tube 955. The pressure regulation system 990 may work in tandem with the storage tank 980 to increase and/or decrease the pressure within the cooling tube 955. In some embodiments, storage tank 980 and pressure regulation system 990 may be independent systems. In other embodiments, the storage tank 980, described in greater detail in conjunction with FIG. 6, may be an integral part of the pressure regulation system 990.

Figure 10:
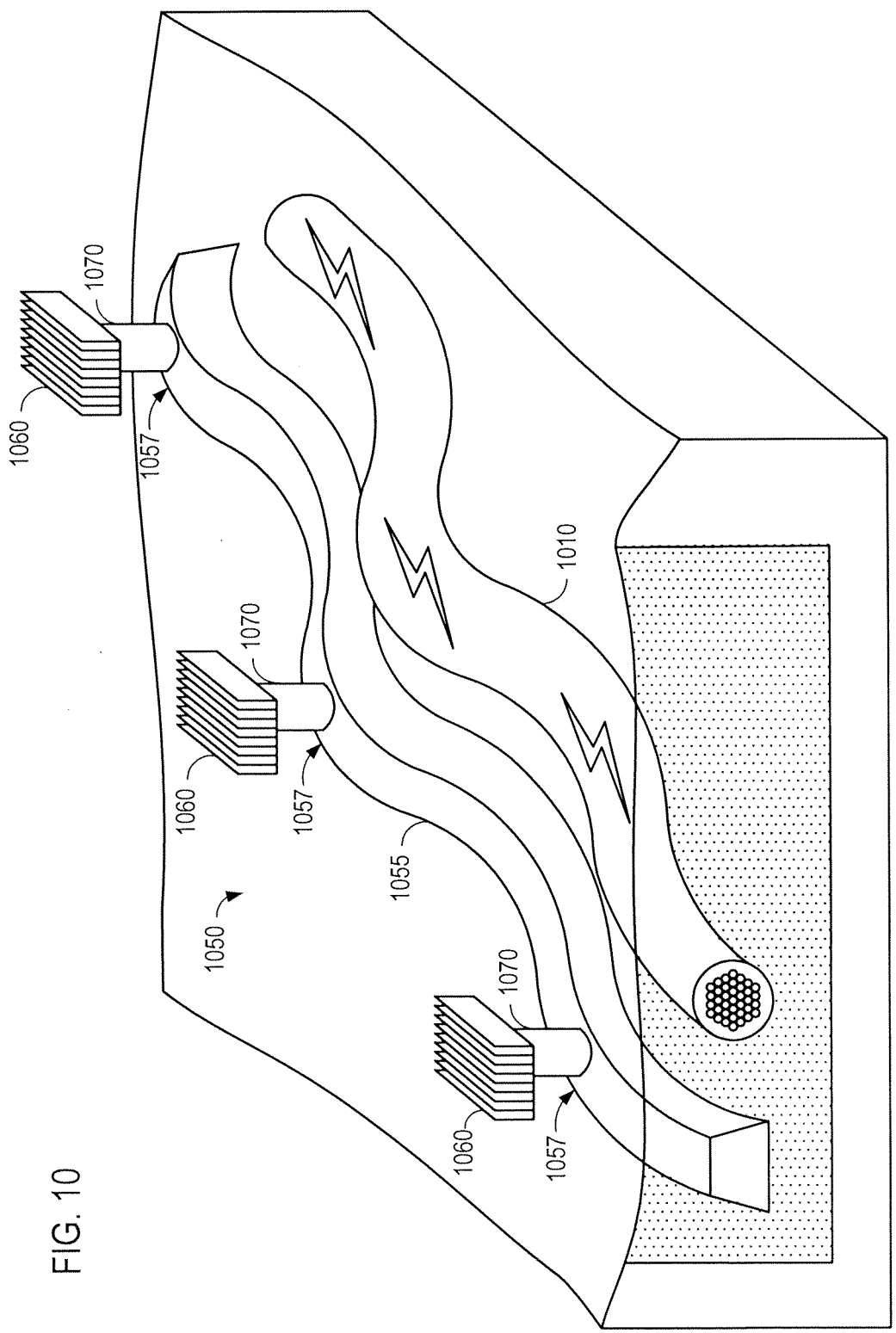
FIG. 10 illustrates an embodiment of a cooling system installed adjacent to a subterranean power line and along the same path, including various local elevational maximums.

FIG. 10 illustrates an embodiment of a cooling system 1050 installed adjacent to a subterranean power line 1010 and along the same path. As can be appreciated by one of skill in the art, the power line 1010 and/or the cooling system 1050 may be installed unevenly. That is, the power line 1010 and/or the cooling system 1050 may be installed with various elevational maximums 1057 and elevational minimums. It will be further appreciated that a heated gaseous fluid within a cooling tube 1055 of the cooling system 1050 may rise to the various local elevational maximums 1057. Accordingly, in some embodiments, risers 1070 may fluidly connect the cooling tube 1055 to one or more heat-exchanging condensers 1060 at the local elevational maximums 1057. Additional risers 1070, gas transport tube(s), and/or heat-exchanging condensers 1060 may be incorporated in the cooling system 1050.

Figure 11:
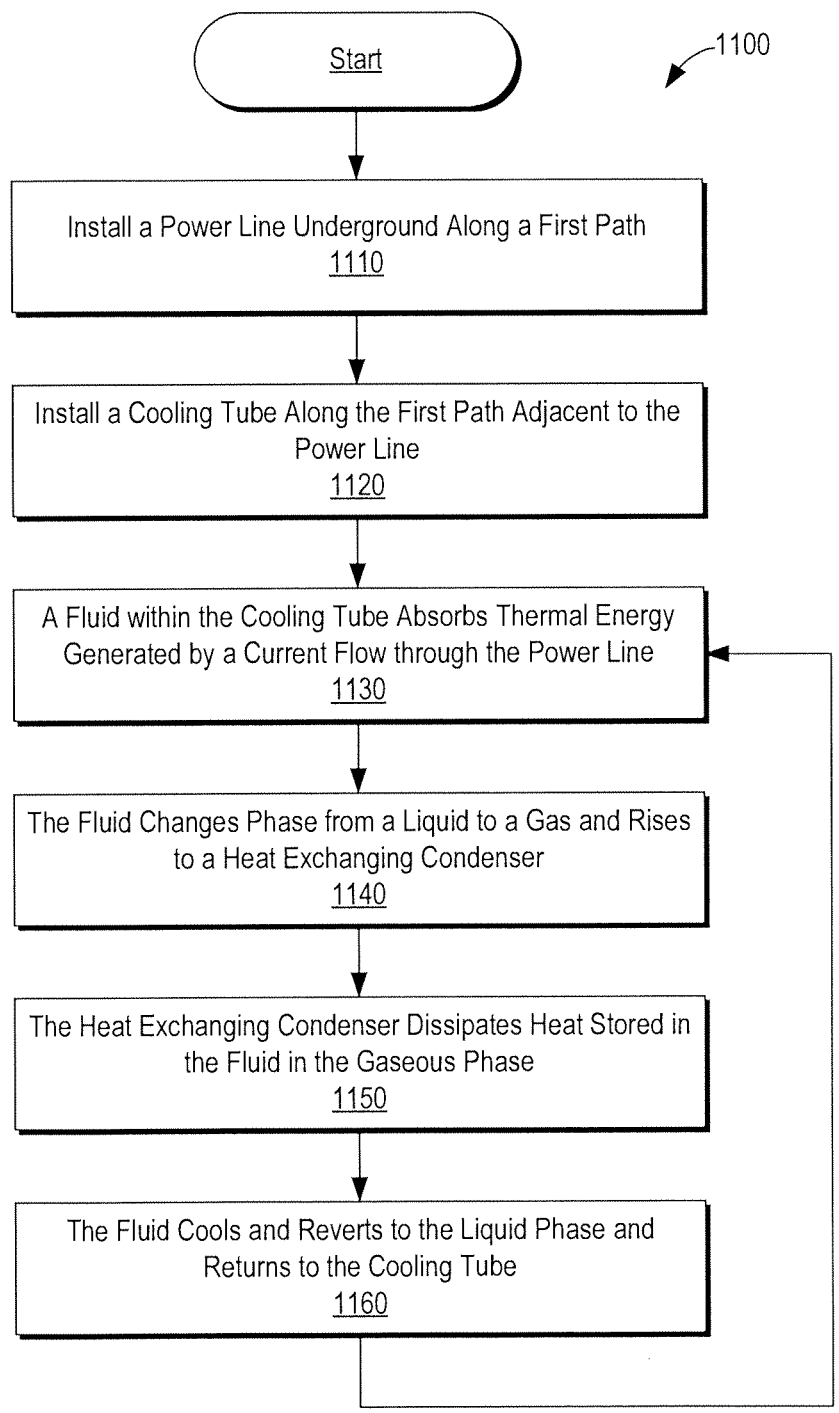
FIG. 11 illustrates a flow chart of a method for delivering power via an underground power transmission system using a phase-change cooling system.

FIG. 11 illustrates a flow chart of a method 1100 for delivering power via an underground power transmission system using a phase-change cooling system. A first step may include installing a power line underground along a first path, at 1110. The power line may include an exterior insulation layer and a conductive core. A second step may be to install a cooling tube along the first path adjacent to the power line, at 1120. According to some embodiments, a power line and/or a cooling tube (and associated components) may be pre-installed. A fluid in a liquid phase within the cooling tube may absorb thermal energy generated by a current flow through the power line, at 1130.

As the fluid absorbs heat from the power line, the fluid may change phase from a liquid to a gas and rise to a heat-exchanging condenser, at 1140. The heat-exchanging condenser may dissipate the heat stored in the fluid in the gaseous phase, at 1150. The fluid may cool and revert to the liquid phase (condense) and return to the cooling tube, at 1160. The process may continually repeat as the fluid in the liquid phase absorbs additional heat from the power line, at 1130.

Figure 12:
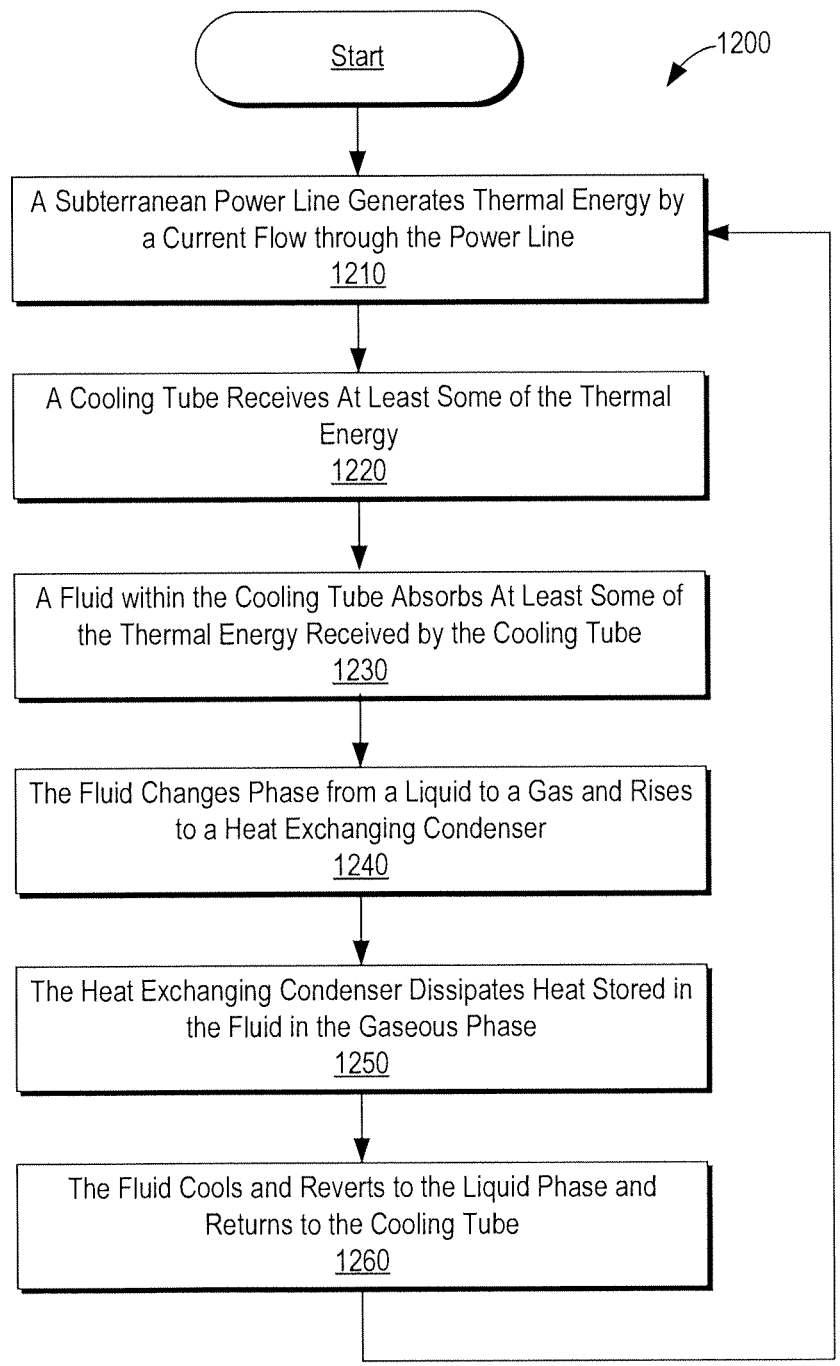
FIG. 12 illustrates a flow chart of a method for cooling a subterranean power line using a phase-change cooling system.

FIG. 12 illustrates a flow chart of a method 1200 for cooling a subterranean power line using a phase-change cooling system. A subterranean power line generates thermal energy via resistive heating as a current flows through the power line, at 1210. A cooling tube receives at least some of the thermal energy generated by the power line, at 1220. Some of the thermal energy may be dissipated in the ground, however, the ground may absorb and dissipate the thermal energy too slowly and result in overheating. Overheating of the power line, surrounding ground, and/or associated electrical power delivery system components may result in damage and/or inefficient power transfer. Accordingly, a phase-change cooling system may be configured to absorb and dissipate a significant amount of the heat generated by the power line.

The fluid within the cooling tube absorbs at least some of the thermal energy received by the cooling tube, at 1230. As the fluid within the cooling tube absorbs heat, the fluid may change phase from a liquid to a gas and rise to a heat-exchanging condenser, at 1240. The heat-exchanging condenser(s) may be positioned on a wall of the cooling tube, or connected to the cooling tube via one or more risers. In some embodiments, a gas transport tube, as described herein, may be incorporated into the cooling system. The heat-exchanging condenser may dissipate heat stored in the fluid in the gaseous phase, at 1250. The fluid may then cool and revert to the liquid phase and return to the cooling tube, at 1260. Once in the cooling tube, the liquid fluid may again absorb additional heat generated by the power line, at 1210. Accordingly, the fluid may be recycled and continually alternate between liquid and gaseous phases as it transfers heat from the cooling tube to the heat exchangers, where the heat is dissipated into the ground, an underground feature (e.g., an underground water source), and/or the air above the ground.

FIG. 13 illustrates a flow chart of a method 1300 for cooling a subterranean power line by dynamically adjusting the pressure of a fluid within a phase-change cooling system. A subterranean power line generates thermal energy via resistive heating as a current flows through the power line, at 1310. A cooling tube receives at least some of the thermal energy generated by the power line, at 1320. The fluid within the cooling tube absorbs at least some of the thermal energy received by the cooling tube, at 1330. The pressure within the cooling tube may be dynamically adjusted, at 1340. By adjusting the pressure within the cooling tube, a maximum possible temperature the fluid may reach may be limited. As the pressure decreases within the cooling tube, the temperature at which the fluid vaporizes (vaporization temperature) decreases. The temperature of the fluid may not increase past the temperature of vaporization as long as the heat-exchanging condensers can dissipate the heat quickly enough.

As the fluid within the cooling tube absorbs heat, the fluid may change phase from a liquid to a gas and rise to a heat-exchanging condenser, at 1350. The temperature at which this occurs may be selected by dynamically adjusting the pressure within the cooling tube. The heat-exchanging condenser(s) may be positioned on a wall of the cooling tube, or connected to the cooling tube via one or more risers. In some embodiments, a gas transport tube, as described herein, may be incorporated into the cooling system. The heat-exchanging condenser(s) may dissipate heat stored in the fluid in the gaseous phase, at 1360. The fluid may then cool and revert to the liquid phase and return to the cooling tube, at 1370. Once in the cooling tube, the liquid fluid may again absorb additional heat generated by the power line, at 1310. Accordingly, the fluid may be recycled and continually alternate between liquid and gaseous phases as it transfers heat from the cooling tube to the heat exchangers, where the heat is dissipated.

This disclosure has been made with reference to various exemplary embodiments, including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps).

While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method for cooling a subterranean power line, comprising:
    installing a cooling tube configured for subterranean installation underground and along a path defined by a subterranean power line, wherein the cooling tube is fluidly independent from the subterranean power line;
    a fluid within the cooling tube absorbing thermal energy generated by a current flow through power line;
    a heat-exchanging condenser fluidly connected to the cooling tube:
        receiving the fluid in a heated, gaseous phase;
        dissipating thermal energy stored in the fluid in the gaseous phase; and
        returning the fluid in a cooled, liquid phase.

2. The method of claim 1, wherein the fluid comprises water.

3. The method of claim 1, wherein the fluid comprises an alcohol.

4. The method of claim 1, wherein the fluid is selected based on at least one thermodynamic condition.

5. The method of claim 4, wherein the thermodynamic condition comprises an enthalpy of vaporization of the fluid.

6. The method of claim 1, further comprising:
    installing a second cooling tube configured for subterranean installation underground and along the path defined by the subterranean power line;
    a second fluid within the second cooling tube absorbing thermal energy from one of a current flow through the power line and the heat-exchanging condenser;
    a second heat-exchanging condenser fluidly connected to the second cooling tube:
        receiving the second fluid in a heated, gaseous phase;
        dissipating thermal energy stored in the second fluid in the gaseous phase; and
        returning the second fluid in a cooled, liquid phase.

7. The method of claim 1, wherein the cooling tube comprises a polyvinyl chloride (PVC).

8. The method of claim 1, wherein the cooling tube is installed in contact with the power line.

9. The method of claim 1, further comprising sealing the fluid within the cooling tube and fluidly connected components.

10. The method of claim 9, further comprising pressurizing the cooling tube at a pressure below an ambient pressure outside of the cooling tube.

11. The method of claim 9, further comprising dynamically adjusting the pressure of the fluid within the cooling tube.

12. The method of claim 11, wherein dynamically adjusting the pressure of the fluid within the cooling tube comprises removing a gas from the cooling tube.

13. The method of claim 1, wherein the fluid in a liquid phase is transported within the cooling tube via surface tension forces.

14. The method of claim 13, wherein the fluid in the liquid phase is transported within the cooling tube via wicking tension forces.

15. A system for cooling a subterranean power line, comprising:
a cooling tube configured for subterranean installation along a path defined by a subterranean power line, wherein the cooling tube is fluidly independent from the subterranean power line, and wherein the cooling tube configured to house a fluid adapted to absorb thermal energy generated by a current flow through the power line; and
a heat-exchanging condenser fluidly connected to the cooling tube, the heat-exchanging condenser configured to:
receive the fluid in a heated, gaseous phase;
dissipate thermal energy stored in the fluid in the gaseous phase; and
return the fluid in a cooled, liquid phase.

16. The system of claim 15, further comprising a storage tank configured to store a reserve of the fluid and selectively provide the reserved fluid to the cooling tube.

17. The system of claim 15, wherein the fluid is configured to be sealed within the cooling tube and fluidly connected components.

18. The system of claim 17, wherein the pressure within the cooling tubes is configured to be adjusted based on a temperature of a ground material surrounding the cooling tube.

19. The system of claim 17, wherein the pressure within the cooling tubes is configured to be adjusted based on an ambient temperature near the heat-exchanging condenser.

20. The system of claim 15, further comprising a riser fluidly connecting the heat-exchanging condenser to the cooling tube,
wherein a first end of the riser is configured to be installed at a lower elevation than a second end of the riser, and
wherein the first end of the riser is fluidly connected to the cooling tube and the second end of the riser is fluidly connected to the heat-exchanging condenser.

21. The system of claim 20, wherein the riser is configured to extend from a local elevational maximum in an unevenly buried cooling tube.

22. The system of claim 20, wherein the fluid in a liquid phase is configured to be returned from the heat-exchanging condenser to the cooling tube via a return tube.

23. The system of claim 15, further comprising:
a gas transport tube configured to be installed at a higher elevation than the cooling tube; and at least one riser configured to fluidly connect the cooling tube to the gas transport tube, and
wherein the heat-exchanging condenser is configured to be fluidly connected to the gas transport tube, such that the heat-exchanging condenser is fluidly connected to the cooling tube through the gas transport tube and the at least one riser.

24. The system of claim 23, wherein the at least one riser comprises a plurality of risers.

25. The system of claim 24, wherein each of the plurality of risers is configured to extend from a local elevational maximum in an unevenly buried cooling tube.

26. The system of claim 23, further comprising a condenser riser configured to fluidly connect the heat-exchanging condenser to the gas transport tube,
wherein a first end of the condenser riser is configured to be installed at a lower elevation than a second end of the condenser riser, and
wherein the first end of the condenser riser is configured to be fluidly connected to the gas transport tube and the second end of the condenser riser is configured to be fluidly connected to the heat-exchanging condenser.

27. The system of claim 15, wherein the fluid comprises at least one vaporizable liquid.

28. A method for controlling the temperature of a subterranean power line, comprising:
installing a sealed cooling tube configured for subterranean installation underground and along a path defined by a subterranean power line, wherein the sealed cooling tube is fluidly independent from the subterranean power line;
dynamically adjusting the pressure of a fluid within the sealed cooling tube in order to control a temperature associated with the subterranean power line;
the fluid within the sealed cooling tube absorbing thermal energy generated by a current flow through the power line;
a heat-exchanging condenser fluidly connected to the sealed cooling tube:
receiving the fluid in a heated, gaseous phase;
dissipating thermal energy stored in the fluid in the gaseous phase; and
returning the fluid in a cooled, liquid phase.

29. The method of claim 28, wherein the pressure within the sealed cooling tube is dynamically adjusted based on a power dissipation within the power line.

30. The method of claim 28, wherein the pressure within the sealed cooling tube is dynamically adjusted based on a current flow of the power line.

31. The method of claim 28, wherein the sealed cooling tube is installed with a gap between the sealed cooling tube and the power line.

32. The method of claim 28, further comprising determining an external condition associated with one of the sealed cooling tube and the power line using a sensor system.

33. The method of claim 32, further comprising transmitting information associated with the external condition is to a data receiving location.

34. The method of claim 28, wherein the fluid comprises at least one non-condensable gas and at least one vaporizable liquid.

35. The method of claim 28, wherein the fluid in a liquid phase is transported within the cooling tube via gravity.

36. The method of claim 28, wherein the fluid in a liquid phase is transported within the cooling tube via surface tension forces.

37. The method of claim 36, wherein the fluid in the liquid phase is transported within the cooling tube via wicking tension forces.

* * * * *

UNITED STATES PATENT AND TRADEMARK OFFICE
CERTIFICATE OF CORRECTION

| | | |
|---|---|---|
| PATENT NO. | : 9,140,499 B2 | Page 1 of 1 |
| APPLICATION NO. | : 13/605836 | |
| DATED | : September 22, 2015 | |
| INVENTOR(S) | : Roderick A. Hyde et al. | |

It is certified that error appears in the above-identified patent and that said Letters Patent is hereby corrected as shown below:

Title Page

Abstract (57) - reads -

"A cooling system for a subterranean power line may include a cooling tube configured to house a fluid. Heat generated by the subterranean power line may be radiated and/or conducted to the cooling tube and absorbed by the fluid within the cooling tube. As the fluid heats up, it may change phase from a liquid to a gas. The hot gas may rise to a heat-exchanging condenser configured to dissipate the heat and condense the fluid back into a liquid. The cool, condensed liquid [[my]] may return from the heat-exchanging condenser to the cooling tube. Risers, gas transport tubes, pressure regulation systems, fluid storage tanks, and other components described herein may increase the efficiency of the cooling system and/or otherwise improve the viability of the cooling system for subterranean power lines."

replace with -
--A cooling system for a subterranean power line may include a cooling tube configured to house a fluid. Heat generated by the subterranean power line may be radiated and/or conducted to the cooling tube and absorbed by the fluid within the cooling tube. As the fluid heats up, it may change phase from a liquid to a gas. The hot gas may rise to a heat-exchanging condenser configured to dissipate the heat and condense the fluid back into a liquid. The cool, condensed liquid may return from the heat-exchanging condenser to the cooling tube. Risers, gas transport tubes, pressure regulation systems, fluid storage tanks, and other components described herein may increase the efficiency of the cooling system and/or otherwise improve the viability of the cooling system for subterranean power lines.--

Signed and Sealed this
Fifteenth Day of March, 2016

Michelle K. Lee
*Director of the United States Patent and Trademark Office*